(12) United States Patent
Meaney et al.

(10) Patent No.: US 9,484,030 B1
(45) Date of Patent: Nov. 1, 2016

(54) AUDIO TRIGGERED COMMANDS

(71) Applicant: Amazon Technologies, Inc., Seattle, WA (US)

(72) Inventors: Michael Patrick Meaney, Dublin (IE); Shiva Kumar Sundaram, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/956,874

(22) Filed: Dec. 2, 2015

(51) Int. Cl.
| | |
|---|---|
| *G10L 13/00* | (2006.01) |
| *G10L 15/00* | (2013.01) |
| *G10L 25/00* | (2013.01) |
| *G10L 15/22* | (2006.01) |
| *G06F 3/16* | (2006.01) |
| *G10L 13/02* | (2013.01) |
| *H04R 3/00* | (2006.01) |

(52) U.S. Cl.
CPC ............. *G10L 15/22* (2013.01); *G06F 3/167* (2013.01); *G10L 13/02* (2013.01); *H04R 3/005* (2013.01); *G10L 2015/223* (2013.01); *G10L 2015/227* (2013.01); *H04R 2203/12* (2013.01)

(58) Field of Classification Search
CPC . G10L 15/22; G10L 2015/223; G10L 15/26; G10L 15/265; G10L 17/22; G10L 19/018; G10L 25/78; G10L 13/00; G10L 15/00; G10L 2015/221; G10L 21/12; G06F 3/167

USPC ................ 704/235, 246, 258, 260, 270, 275
See application file for complete search history.

(56) References Cited

U.S. PATENT DOCUMENTS

| | | | | | |
|---|---|---|---|---|---|
| 5,758,318 | A | * | 5/1998 | Kojima | G10L 15/22 704/246 |
| 5,890,116 | A | * | 3/1999 | Itoh | G10H 1/0008 704/260 |
| 6,477,239 | B1 | * | 11/2002 | Ohki | G09B 21/009 348/14.01 |
| 7,181,387 | B2 | * | 2/2007 | Ju | G10L 15/187 704/1 |
| 7,299,181 | B2 | * | 11/2007 | Ju | G10L 15/187 704/257 |
| 2005/0197843 | A1 | * | 9/2005 | Faisman | G10L 15/24 704/276 |
| 2006/0004572 | A1 | * | 1/2006 | Ju | G10L 15/187 704/243 |
| 2007/0143100 | A1 | * | 6/2007 | Agapi | G06F 17/2795 704/9 |

* cited by examiner

*Primary Examiner* — Edgar Guerra-Erazo
(74) *Attorney, Agent, or Firm* — Seyfarth Shaw LLP; Ilan N. Barzilay

(57) ABSTRACT

A system is configured to execute audio-initiated commands. The system detects audio and determines if a first sound is included in the audio. The system then processes further incoming audio to detect a second sound. If the second sound is not detected within a time threshold, the system executes a command. The command may include delivering a message, outputting audio corresponding to synthesized speech, or some other executable command.

20 Claims, 23 Drawing Sheets

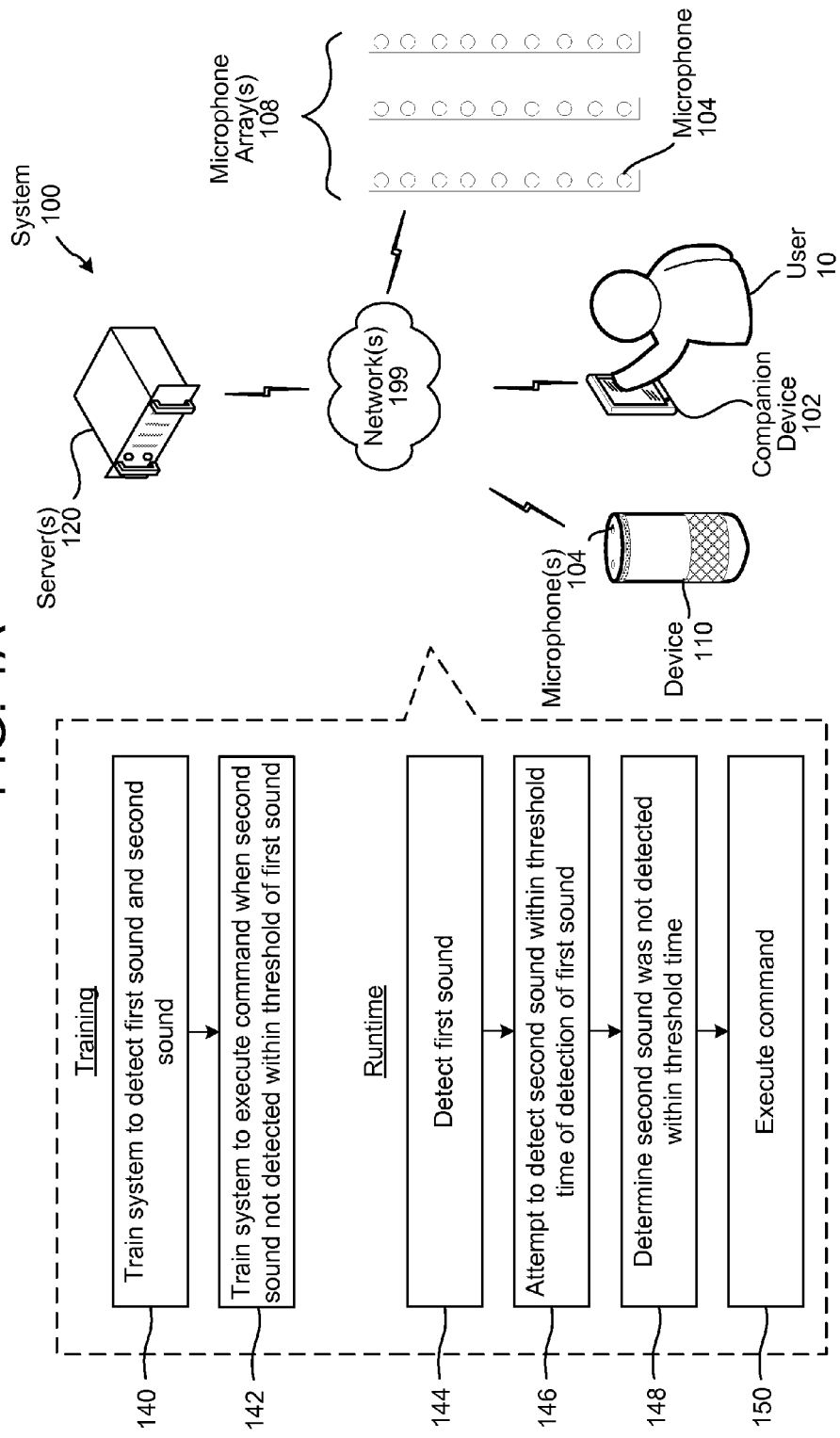

FIG. 1B
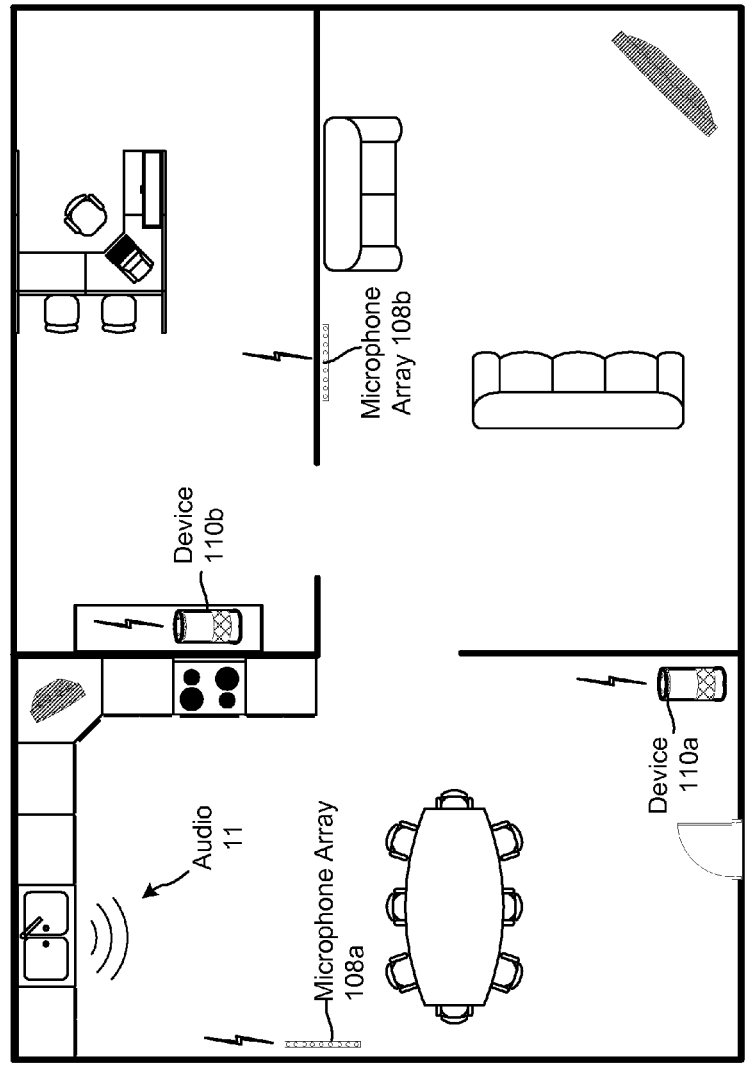
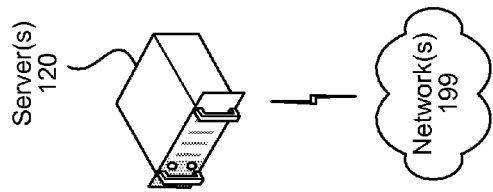

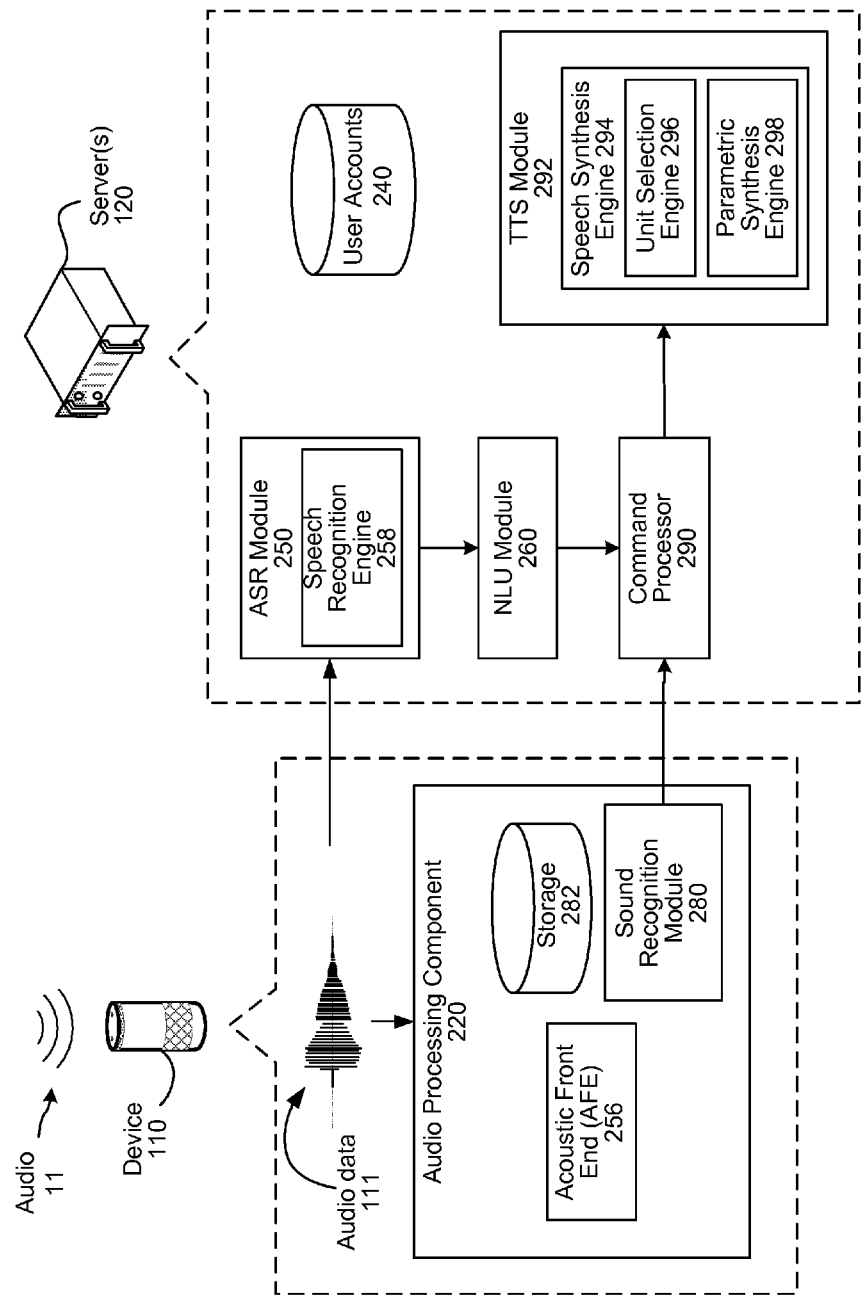

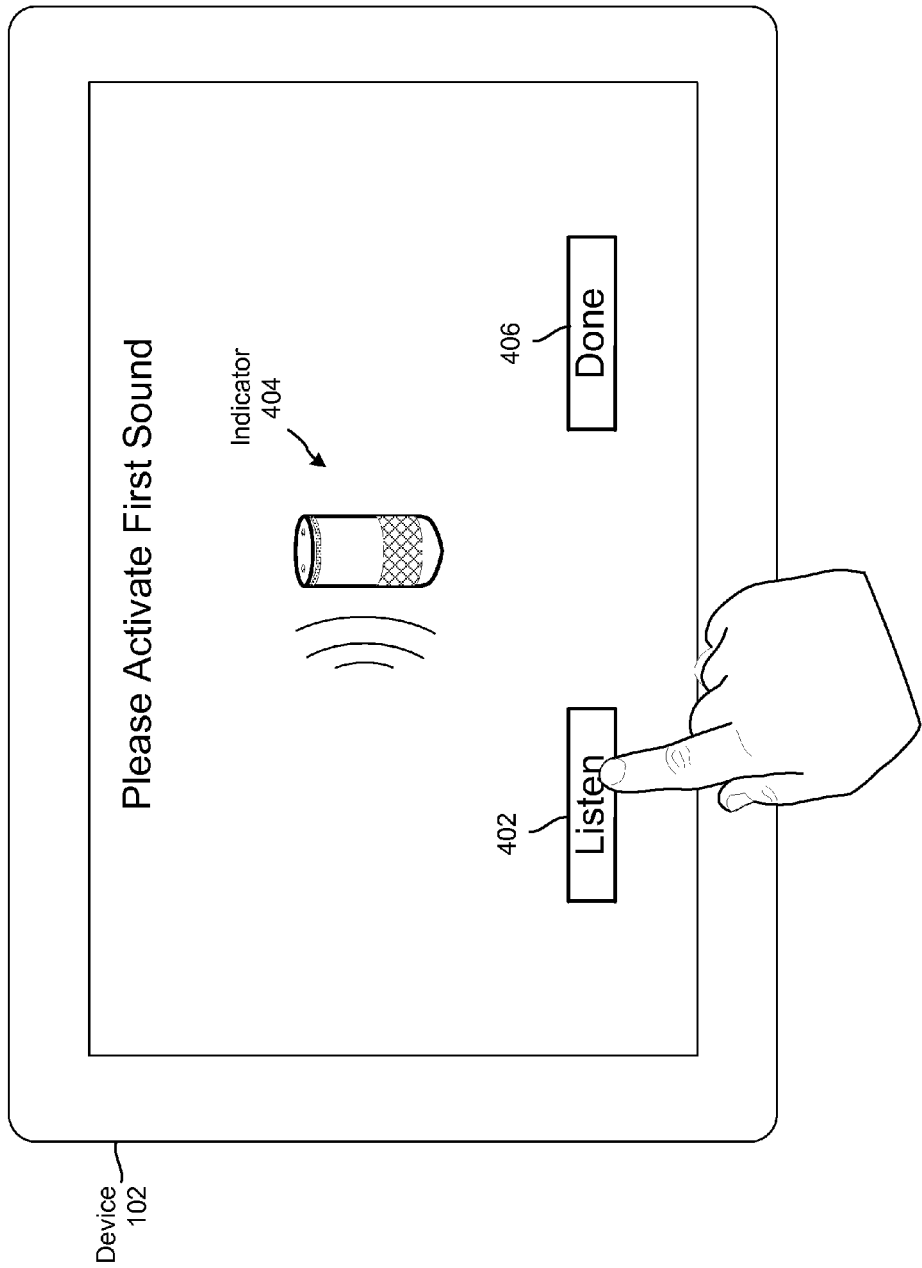

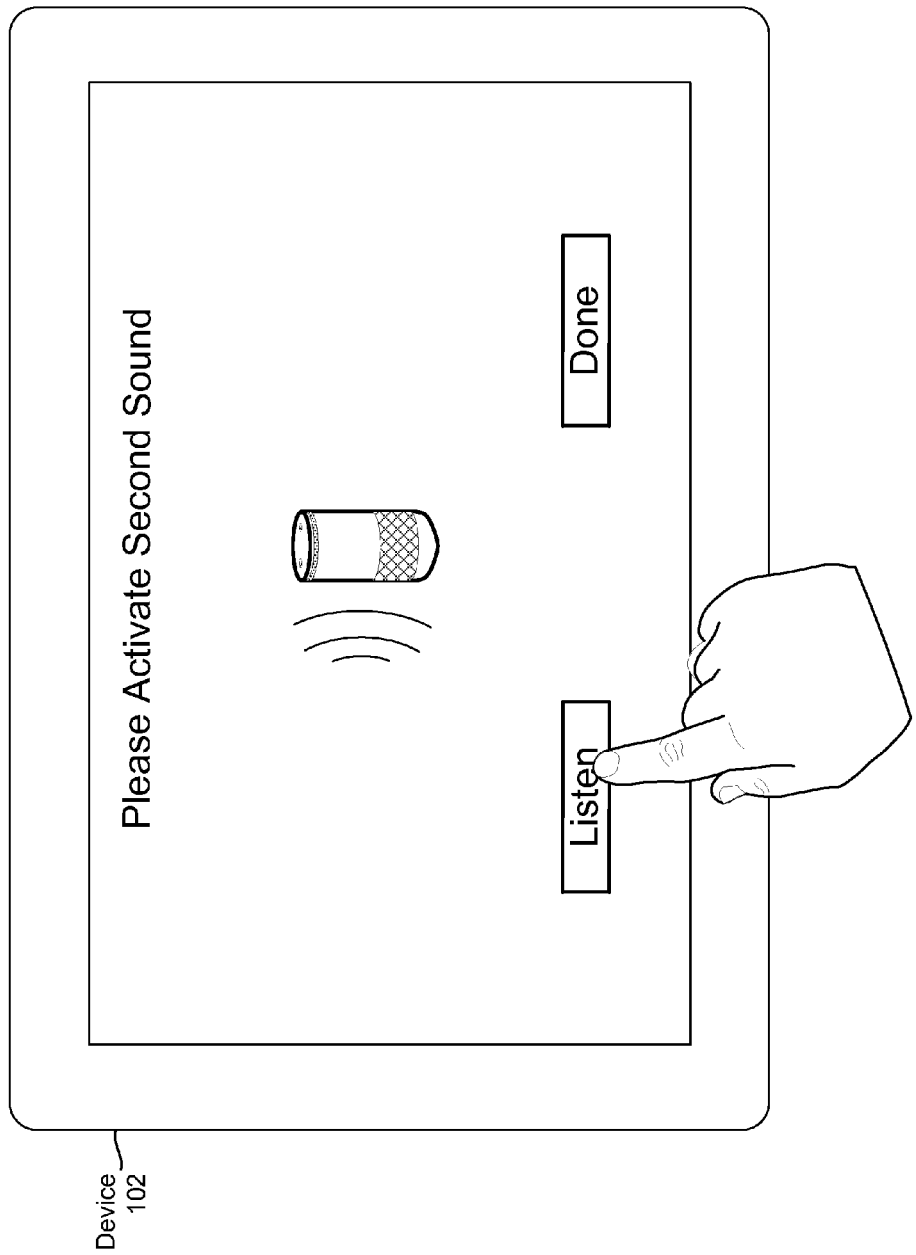

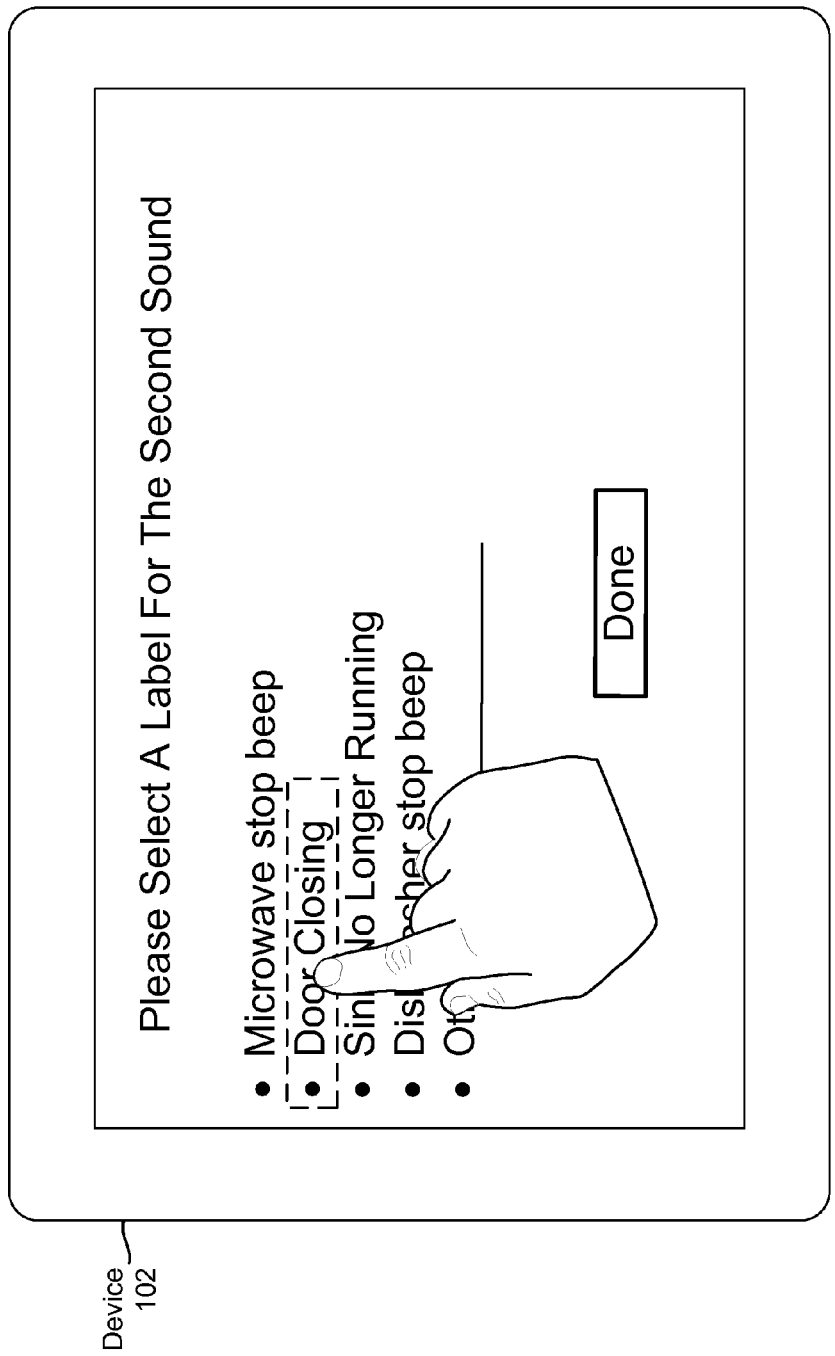

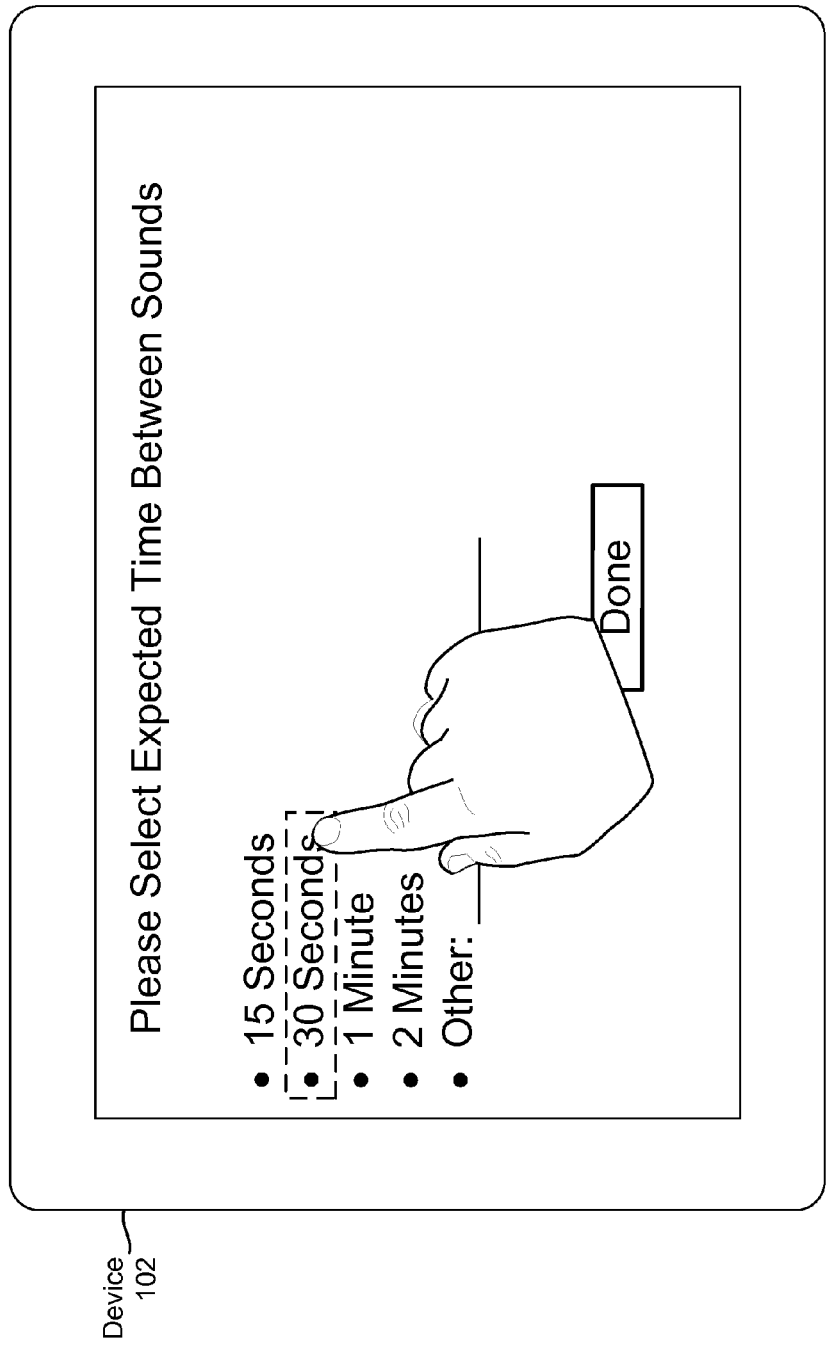

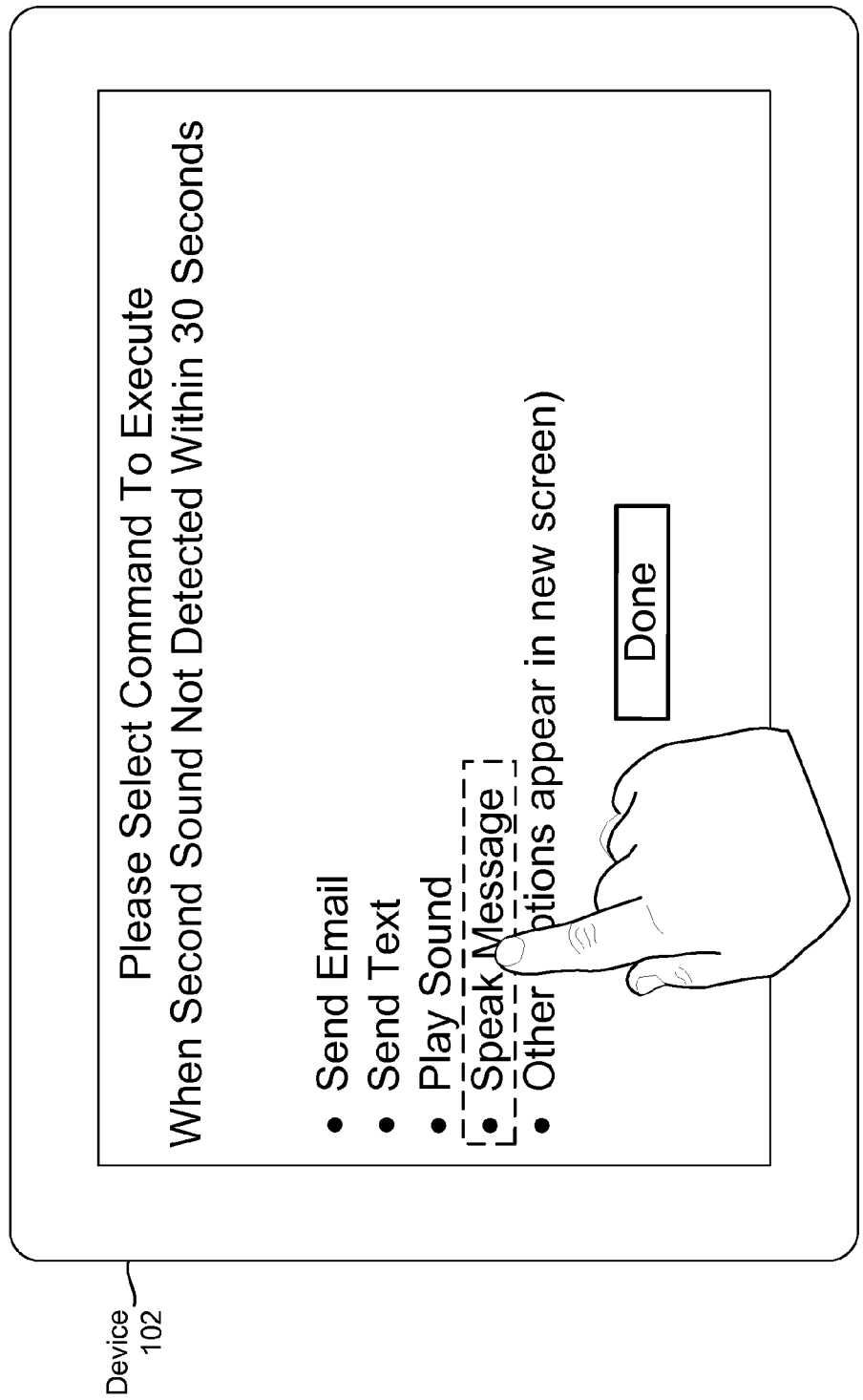

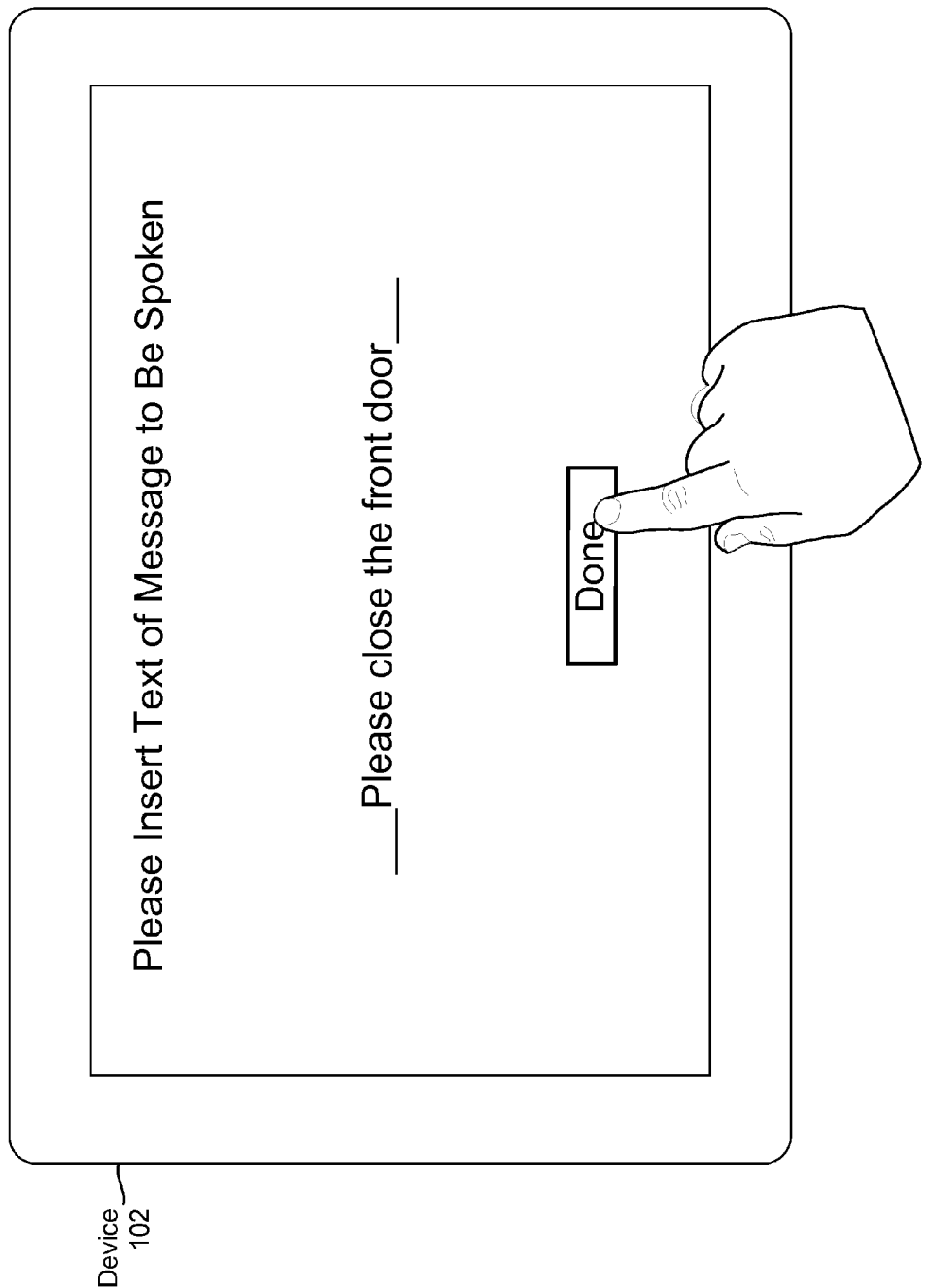

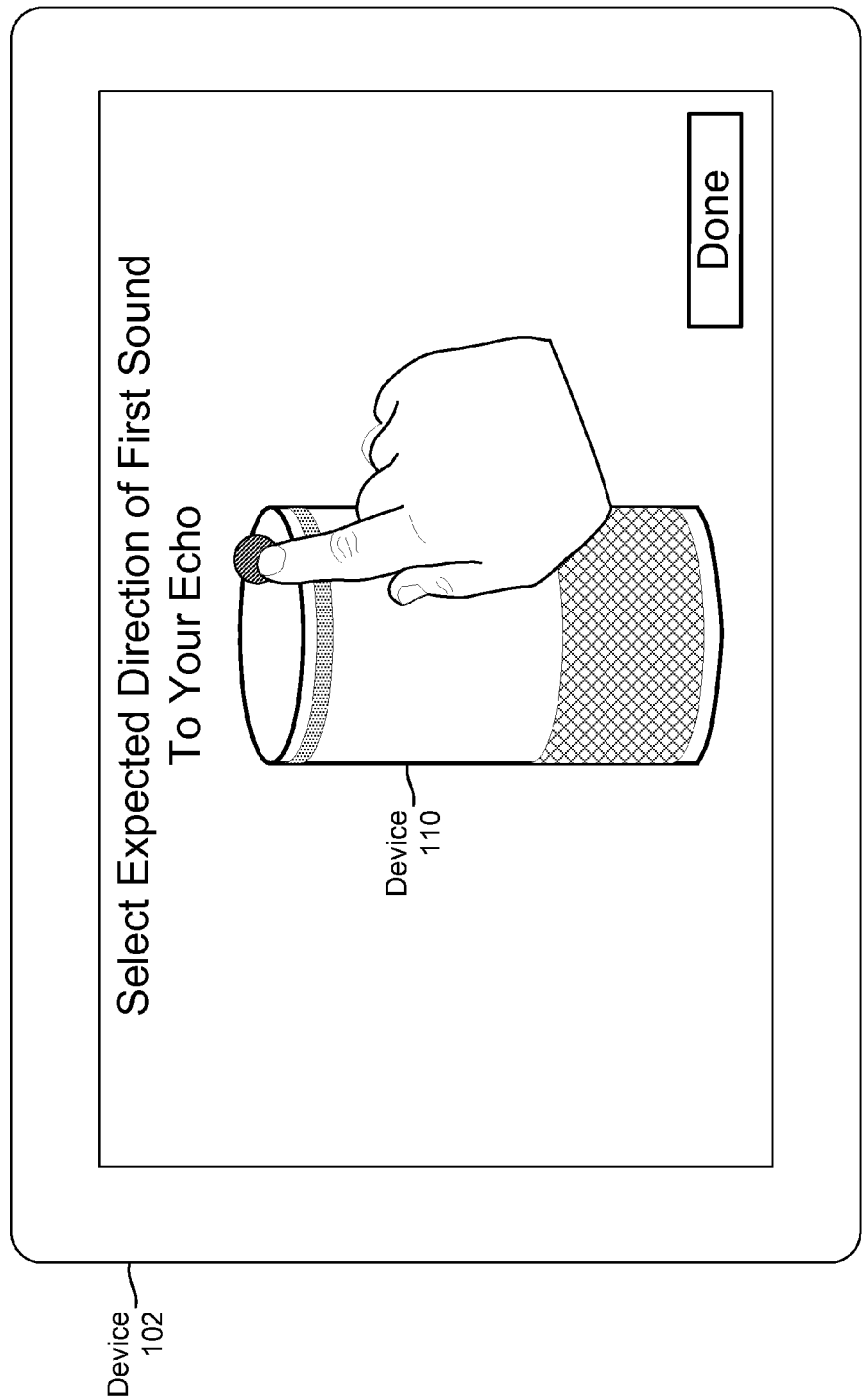

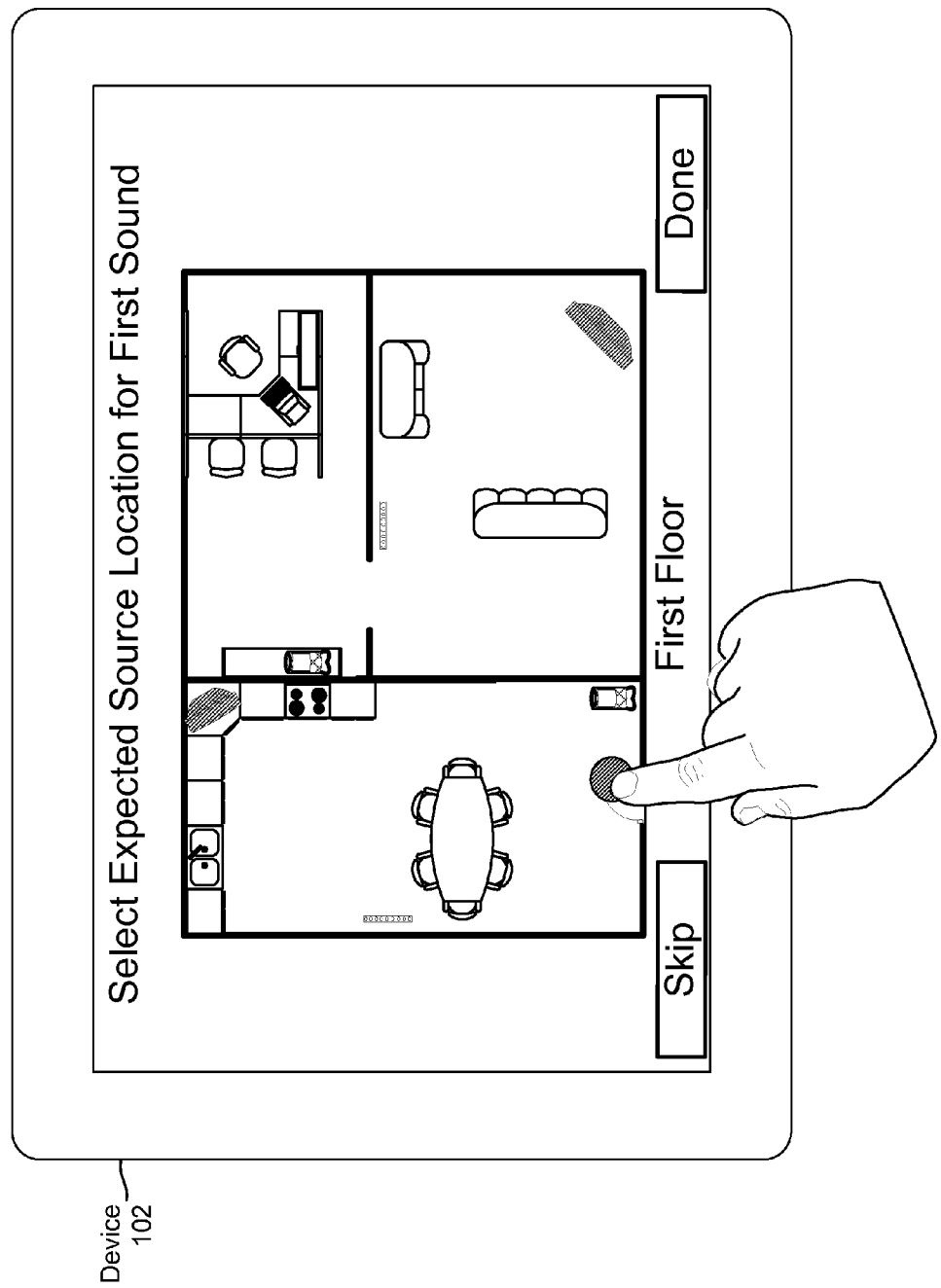

AUDIO TRIGGERED COMMANDS

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system for performing audio triggered commands according to embodiments of the present disclosure.

FIG. 2 is a conceptual diagram of various components for performing audio triggered commands according to embodiments of the present disclosure.

FIGS. 4A-4I illustrate configuring an audio triggered command according to embodiments of the present disclosure.

FIGS. 5A-5B illustrate configuring a direction of expected audio according to embodiments of the present disclosure.

FIG. 6 illustrates configuring a direction of expected audio according to embodiments of the present disclosure.

DETAILED DESCRIPTION

Figure 3:
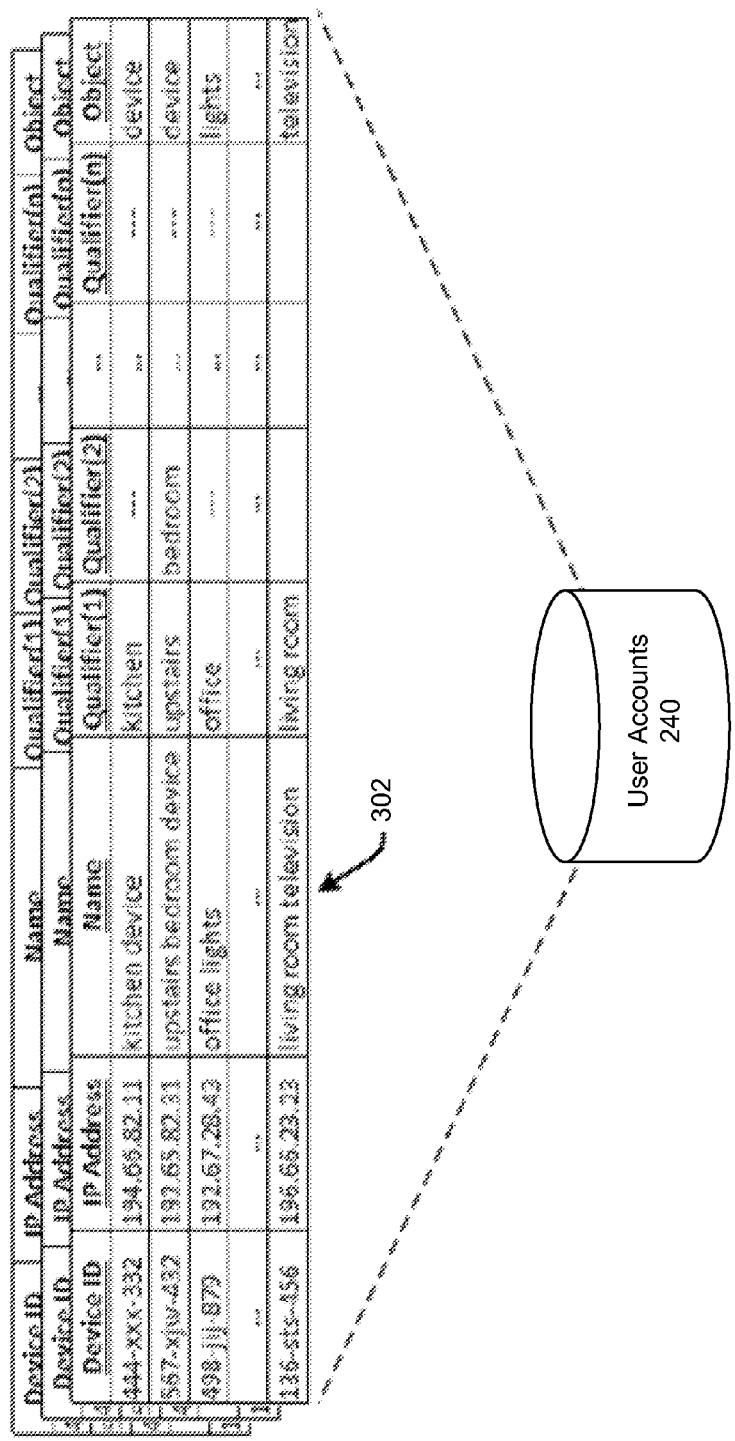
FIG. 3 illustrates data stored and associated with user accounts according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

An increasing number of devices, including home appliances, are becoming capable of processing spoken commands using ASR processing. Further, an increasing number of devices are capable of providing output to users in the form of synthesized speech using TTS processing. Such devices may also be configured to recognize certain non-speech (and even non-voice) sounds, such as regular household sounds (a door closing, a sink running, etc.), or other sounds. The sounds may also be sounds associated with an activity ending, such as a sink no longer running. Devices and systems may be configured to a detect certain sound, and, if a corresponding sound is not detected within a certain time following the certain sound, execute a command, such as outputting speech using TTS processing. For example, if a system detects audio of a front door opening, but does not detect audio of the front door closing within two minutes, the system may output speech such as "please close the front door."

As can be envisioned, many such audio triggered operations may be performed by a system. The system may also be configured to receive customization inputs from a user (such as on a companion device) to configure the system to execute such audio triggered commands. Such a combination of configurability, audio detection, remote command execution, and ability to speak responses using TTS processing, may be used to configure a system to execute reminders, behavior corrections, or other such activities. These reminders may not only correct undesired user behaviors, but may also provide users with a sense of comfort knowing that a system is programmed to detect, and potentially correct, such undesired behaviors. Such a system may also be particularly useful for those with hearing impairments, as the system may detect sounds that certain user may not be able to detect, and may execute a command (which may include a visual signal such as sending a message, flashing a light, etc.) in response.

Offered is a system and method for executing audio triggered commands. In one embodiment, a system recognizes a first event as represented in a received audio signal. The system then analyzes further input audio signal(s) to detect a second event. If the second event is not detected within a threshold period of time, the system may execute a command, such as outputting speech using TTS processing. Other embodiments are also possible.

An example of the system is described in reference to FIG. 1A. As shown in FIG. 1A, a system 100 may be configured to execute a command when a second command is not detected within a certain time threshold of a first command. As shown, a speech controlled device 110 equipped with one or more microphones 104 is connected over a network 199 to one or more servers 120. The device 110 is configured to detect audio using microphone 104 associated with a spoken utterance from user 10. The system 100 may, during a training phase, be trained (140) to detect a first sound and a second sound. This training may involve a user interacting with a companion device 102 (such as a smartphone, tablet, etc.) to allow the system 100 to recognize certain sounds that the user 10 desires the system 100 to learn. The system 100 may then create models or other data associated with each sound that may be stored, for example on device 110, server 120, etc. The model(s) may be referred to later during runtime to determine if the specific sounds are detected. The system 100 may detect audio during runtime using microphone(s) 104 of device 110 or other microphones, such as a microphone 104 that may be part of a microphone array 108, where the array is communicably connected (for example using network 199) with other components of system 100, for example server(s) 120, etc. For example, as shown in FIG. 1B, a number of audio detection devices may be located in a home, such as devices 110*a* and 110*b* and microphone arrays 108*a* and 108*b*. The audio detection devices are in communication with server(s) 120 across network 199.

During training, the system 100 may also be trained (142) to execute a command when the second sound is not detected within a threshold amount of time of the first sound, where the second sound may be cessation of the first sound or a different sound. For example, a user 10 operating an application on the companion device 102, may train (140) the system to recognize when water begins running in the sink illustrated in FIG. 1B. The water beginning to run may be the first sound. The user 10, using the application, may then train (140) the system to recognize when water stops running in the sink. The water stopping running in the sink may be the second sound. The user 10, again using the application may also train (142) the system to execute a command when the second sound is not detected within a threshold amount of time of the first sound. The threshold may be, for example, 60 seconds. The command may be, for example, sending the user a message on companion device 102 that the sink is running, or outputting synthesized speech through devices 110*a* and/or 110*b* that "the sink is running." Other examples are also possible.

Thus, during runtime the system may detect (144) the first sound. This may occur when audio 11 is detected from the sink and captured by one of the audio detection devices (110*a*, 110*b*, 108*a*, 108*b*). The audio may be converted into audio data (for example, by an audio detection device). If applicable, the audio data may then be sent to a device with a sound recognition module 280, for example sent from a microphone array 108 to a device 110 or server 120 if the array 108 lacks a sound recognition module 280. The device 110 or server 120 (or array 108 if so configured) matches the audio data to one or more first models associated with the first sound. If the audio data matches the first model(s) with a sufficient confidence, the system 100 may determine that the first sound has been detected. The system may then attempt (146) to detect the second sound within the threshold time of detection of the first sound. Thus the system may detect further audio and convert that further audio into further audio data. The further audio may be converted into further audio data and matched to one or more second models associated with the second sound. If the further audio data does not match the second model(s) with a sufficient confidence within the threshold time, the system may determine (148) that the second sound was not detected within the threshold time. The system may then execute (150) the command associated with the training step 142. For example, if the user selected a speech output of "the sink is running," the server(s) 120 may convert the text "the sink is running" into output audio, and send the output audio to a device 110 for playback.

The steps described in reference to FIG. 1A (and described below) may be performed by various components of the system 100, such as some combination of the server(s) 120, device(s) 110, companion device(s) 102, network 199, etc. For example, audio data may be sent from a device 110 to a server 120 for analysis by the server 120 to determine if the audio data corresponds to a first sound and/or second sound. In another example, a server 120 may synthesize speech from text and send audio data corresponding to the synthesized speech to a device 110 in order to output synthesized speech corresponding to the executed (150) command. Various combinations of processing tasks may be configured.

The system 100 of FIGS. 1A and 1B may operate using various components as described in FIG. 2. FIG. 2 is a conceptual diagram of various components of a system for performing audio triggered commands, as well as performing speech processing, according to embodiments of the present disclosure. The various components illustrated may be located on a same or different physical devices. Communication between various components illustrated in FIG. 2 may occur directly or across a network 199. An audio capture component, such as a microphone of device 110, captures audio 11 corresponding to a sound, spoken utterance, or other audio. The device 110 (or other audio capture device such as microphone array 108) converts the input audio 11 into audio data 111. The audio data may be processed by an audio processing component 220 (for example located on device 110). For example, the audio data 111 may be analyzed by a sound recognition module 280 to determine if certain sounds that are recognizable by the sound recognition module 280 are represented in the audio data 111. Alternatively, the audio data 111 (or audio 11) may be processed by acoustic front end (AFE) 256 prior to further downstream processing. The AFE 256 transforms the audio data from the microphone into data for processing by downstream components, such as the sound recognition module 280 or an ASR module 250, either of which may be located on the device 110, on the server 120, or a combination thereof. The AFE may reduce noise in the audio data 111 and divide the digitized audio data into frames representing a time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for audio processing, such as ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. Unless specifically stated otherwise, the audio data 111 discussed below corresponding to the audio 11 may be either pre- or post-processing by the AFE 256.

The device 110/audio processing component 220 may be configured to recognize specific sounds (as described above in reference to FIGS. 1A and 1B), which may be non-speech sounds (such as a sink running, door closing, toilet flushing, etc.) or may include speech sounds. The device 110 may use various techniques to determine whether audio data includes speech or configured sounds (i.e., includes non-noise audio). Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech/specific sounds from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in storage, which acoustic models may include models corresponding to speech, specific sounds, noise (such as environmental noise or background noise), or silence. Still other techniques may be used to determine whether desired sounds or speech is present in the audio input.

Once non-noise audio is detected in the audio received by the device 110 (or separately from speech detection), the system 100 (for example through device 110) may use the sound recognition module 280 to detect specific sounds in the audio. This process may also be referred to as keyword detection or acoustic event detection. Specifically, acoustic event detection is typically performed without performing linguistic analysis, textual analysis or semantic analysis. Instead, incoming audio (or audio data) is analyzed to determine if specific characteristics of the audio match preconfigured sound profiles, which may include acoustic waveforms, acoustic signatures, or other data to determine if the incoming audio "matches" stored audio data corresponding to a specific sound or keyword. The models may describe acoustic characteristics (such frequency levels, volume levels, etc.) that are expected by a particular sound during the sound's expected duration. Thus the system 100 may compare incoming audio data to stored model(s), and if the comparison results in a sufficiently high confidence of a match, the system 100 may determine that the sound corresponding to the stored model(s) has been detected.

Thus, the sound recognition module 280 may compare audio data to stored profiles, models or data to detect a specific sound. One approach for acoustic event detection applies general large vocabulary continuous speech recognition (LVCSR) systems to decode the audio signals, with acoustic event searching conducted in the resulting lattices or confusion networks. LVCSR decoding may require relatively high computational resources. Another approach for wakeword spotting builds hidden Markov models (HMM) for each key wakeword word and non-wakeword audio signals respectively. The non-wakeword audio may includes other specific sounds, spoken words, background noise, etc. There can be one or more HMMs built to model the desired acoustic characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the keyword spotting system may be built on deep neural network (DNN)/recursive neural network (RNN) structures directly, without HMM involved. Such a system may estimate the posteriors of keywords with context information, either by stacking frames within a context window for DNN, or using RNN. Following-on posterior threshold tuning or smoothing is applied for decision making. Other techniques for keyword detection, such as those known in the art, may also be used.

In the context of specific sound detection, the above or similar techniques may be used by a device 110 to determine if a sound is detected. In the context of speech processing, if a specific sound is a "wakeword," once the wakeword is detected, the local device 110 may "wake" and begin transmitting audio data 111 corresponding to input audio 11 to the server(s) 120 for speech processing. Further, a local device 110 may "wake" upon detection of speech/spoken audio above a threshold, as described herein. Audio data corresponding to that audio may be sent to a server 120 for routing to a recipient device or may be sent to the server for speech processing for interpretation of the included speech (either for purposes of enabling voice-communications and/ or for purposes of executing a command in the speech). Thus, upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base. For example, the ASR process may compare the input audio data with models for sounds (e.g., subword units or phonemes) and sequences of sounds to identify words that match the sequence of sounds spoken in the utterance of the audio data.

Thus, as part of speech processing the device 110 may send audio data 111 corresponding to the input audio 11 to an ASR module 250. The audio data 111 may be output from the acoustic front end (AFE) 256 located on the device 110 prior to sending to an ASR module 250 (which may be located on server(s) 120). Or the audio data 111 may be in a different form for processing by a remote AFE 256, such as the AFE 256 located with the ASR module 250.

The ASR module 250 converts the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models stored in an ASR model knowledge base. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR module 250 outputs the most likely text recognized in the audio data. The ASR process may also output multiple hypotheses in the form of a lattice or an N-best list with each hypothesis corresponding to a confidence score or other score (such as probability scores, etc.).

The speech recognition engine 258 may process the output from the AFE 256 with reference to information stored in speech/model storage in communication with the ASR module. Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 compares the speech recognition data with acoustic models, language models, and other data models and information for recognizing the speech conveyed in the audio data. The speech recognition engine 258 attempts to match received feature vectors to language phonemes and words as known in the stored acoustic models and language models. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing may include a named entity recognition (NER) module and intent classification (IC) module, a result ranking and distribution module, and knowledge base. The NLU process may also utilize gazetteer information in NLU processing. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on audio 11 of an utterance) and attempts to make a semantic interpretation of the text. That is, the NLU process determines the meaning behind the text based on the individual words and then implements that meaning. The NLU module 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

A name entity recognition process receives a query in the form of ASR results and attempts to identify relevant grammars and lexical information that may be used to construe meaning. To do so, a name entity recognition module may begin by identifying potential domains that may relate to the received query. The NLU knowledge base may include a databases of identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database, a particular set of intents/actions, and a particular personalized lexicon. Each gazetteer may include domain-indexed lexical information associated with a particular user and/or device. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification process parses the query to determine an intent or intents for each identified domain, where the intent corresponds to the action to be performed that is responsive to the query. Each domain may be associated with a database of words linked to intents. For example, a music intent database may link words and phrases such as "quiet," "volume off," and "mute" to a "mute" intent. The IC process identifies potential intents for each identified domain by comparing words in the query to the words and phrases in an intents database.

In order to generate a particular interpreted response, a named entity recognition (NER) process applies the grammar models and lexical information associated with the respective domain. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by an IC module are linked to domain-specific grammar frameworks with "slots" or "fields" to be filled. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, an NER module may parse the query to identify words as subject, object, verb, preposition, etc., based on grammar rules and models, prior to recognizing named entities. The identified verb may be used by the IC module to identify intent, which is then used by the NER module to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module may search the database of generic words associated with the domain (in the NLU's knowledge base). So for instance, if the query was "play songs by the rolling stones," after failing to determine an album name or song name called "songs" by "the rolling stones," the NER may search the domain vocabulary for the word "songs." In the alternative, generic words may be checked before the gazetteer information, or both may be tried, potentially producing two different results.

The comparison process used by the NER module may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module may also use contextual operational rules to fill slots. For example, if a user had previously requested to pause a particular song and thereafter requested that the voice-controlled device to "please un-pause my music," the NER module may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

In certain embodiments, the command to be executed by the system involves performing text-to-speech processing. For example, if a door opening (e.g., the first sound) is detected, and the door closing (e.g., the second sound) within a certain time of the door opening, the system may be configured to output synthesized speech corresponding to the text "please close the door." Such speech synthesis may be performed by a text-to-speech (TTS) module 292. The TTS module 292 may be configured to synthesize speech based on text configured to be spoken based on an initial detected audio (and/or a second follow-up audio that was not detected within a time threshold). The TTS module 292 may receive the text and convert it to speech.

The TTS module/processor 292 may include a TTS front end (TTSFE), a speech synthesis engine 294, and TTS storage. The TTSFE transforms input text data (for example from command processor 290) into a symbolic linguistic representation for processing by the speech synthesis engine 294. The speech synthesis engine 294 compares the annotated phonetic units models and information stored in the TTS storage for converting the input text into speech. The TTSFE and speech synthesis engine 294 may include their own controller(s)/processor(s) and memory or they may use the controller/processor and memory of the server 120, device 110, or other device, for example. Similarly, the instructions for operating the TTSFE and speech synthesis engine 294 may be located within the TTS module 292, within the memory and/or storage of the server 120, device 110, or within an external device.

Text input into a TTS module 292 may be sent to the TTSFE for processing. The front-end may include modules for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS module 292 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage module. The linguistic analysis performed by the TTSFE may also identify different grammatical components such as prefixes, suffixes, phrases, punctuation, syntactic boundaries, or the like. Such grammatical components may be used by the TTS module 292 to craft a natural sounding audio waveform output. The language dictionary may also include letter-to-sound rules and other tools that may be used to pronounce previously unidentified words or letter combinations that may be encountered by the TTS module 292. Generally, the more information included in the language dictionary, the higher quality the speech output.

Based on the linguistic analysis the TTSFE may then perform linguistic prosody generation where the phonetic units are annotated with desired prosodic characteristics, also called acoustic features, which indicate how the desired phonetic units are to be pronounced in the eventual output speech. During this stage the TTSFE may consider and incorporate any prosodic annotations that accompanied the text input to the TTS module 292. Such acoustic features may include pitch, energy, duration, and the like. Application of acoustic features may be based on prosodic models available to the TTS module 292. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information.

The output of the TTSFE, referred to as a symbolic linguistic representation, may include a sequence of phonetic units annotated with prosodic characteristics. This symbolic linguistic representation may be sent to a speech synthesis engine 294, also known as a synthesizer, for conversion into an audio waveform of speech for output to an audio output device (such as a microphone) and eventually to a user. The speech synthesis engine 294 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 294 may perform speech synthesis using one or more different methods. In one method of synthesis called unit selection, described further below, a unit selection engine 296 matches the symbolic linguistic representation created by the TTSFE against a database of recorded speech, such as a database of a voice corpus. The unit selection engine 296 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 296 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 298, digital signal processor or other audio generation device to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS module 292 may include an acoustic model, or other models, which may convert a symbolic linguistic representation into a synthetic acoustic waveform of the text input based on audio signal manipulation. The acoustic model includes rules which may be used by the parametric synthesis engine 298 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE.

The parametric synthesis engine 298 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 294, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

A TTS module 292 may be configured to perform TTS processing in multiple languages. For each language, the TTS module 292 may include specially configured data, instructions and/or components to synthesize speech in the desired language(s). To improve performance, the TTS module 292 may revise/update the contents of the TTS storage based on feedback of the results of TTS processing, thus enabling the TTS module 292 to improve speech recognition.

Other information may also be stored in the TTS storage for use in speech recognition. The contents of the TTS storage may be prepared for general TTS use or may be customized to include sounds and words that are likely to be used in a particular application. For example, for TTS processing by a global positioning system (GPS) device, the TTS storage may include customized speech specific to location and navigation. In certain instances the TTS storage may be customized for an individual user based on his/her individualized desired speech output. For example a user may prefer a speech output voice to be a specific gender, have a specific accent, speak at a specific speed, have a distinct emotive quality (e.g., a stern voice to remind a listener to close a door), or other customizable characteristic as explained in other sections herein. The speech synthesis engine 294 may include specialized databases or models to account for such user preferences.

For example, to create the customized speech output of the system, the system may be configured with multiple voice corpuses/unit databases, where each unit database is configured with a different "voice" to match desired speech qualities. The voice selected by the TTS module 292 to synthesize the speech. For example, one voice corpus may be stored to be used to synthesize whispered speech (for example, for outputting during nighttime ourse), another may be stored to be used to synthesize excited speech, and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus matches the respective desired speech quality. The customized voice corpuses may then be used during runtime to perform unit selection to synthesize speech having a speech quality corresponding to the input speech quality. Additionally, parametric synthesis may be used to synthesize speech with the desired speech quality. For parametric synthesis, parametric features may be configured that match the desired speech quality.

The server 120 may also include data regarding user accounts, shown by user account storage 240. The user accounts 240 may include a variety of information related to individual users, households, accounts, etc. that interact with the system. A variety of data may be stored in user account storage 240. For present illustration, as shown in FIG. 3, the user account storage 240 may include a data regarding the devices associated with particular individual user accounts 302. Such data may include device identifier (ID) and internet protocol (IP) address information for different devices as well as names by which the devices may be referred to by a user. Further qualifiers describing the devices may also be listed along with a description of the type of object of the device.

The speech processing capabilities may be used to configure the system to detect sounds within a time threshold of each other, and to execute a command in response (for example a TTS speech output) as described above in reference to FIGS. 1A and 1B. For example, a user may speak commands to the system that the system may recognize are commands to train and configure the system to perform the operations of FIGS. 1A and 1B. Alternatively, an application may operate on a companion device 102 (where the companion device 102 is in communication with other components of the system 100, for example over network 199), where the application is operable to configure the system 100 to perform the operations of FIGS. 1A and 1B.

The application may offer a user certain pre-programmed choices of types of sounds that the system may detect. The types of sounds may include examples of typical household sounds (door closing, sink running), office sounds (elevator operating, phone ringing), or other sounds. The pre-programmed sounds may each be associated with one or more stored sound profiles, which may include model(s), acoustic signatures, or other data that the system may use to identify specific sounds in detected audio. The sound profile may be associated with a user account/profile, device profile, etc. as discussed below in reference to FIG. 8. Thus the user may select from among certain stored sounds when performing the training of FIG. 1A. In another embodiment, the application may offer the user the option of training the system to recognize a sound of the user's choice. For example, as shown in FIG. 4A an application operating on the device 102 may offer the user a chance to train the system to learn the first sound desired by the user to initiate the audio triggered command.

As shown in FIG. 4A, the device 102 may prompt the user to activate the first sound. Upon selecting the listen button 402, the device 102 may display an indicator 404 to illustrate to the user that the system is "listening" using its available audio detection devices. For example, the system may determine that the user 10 operating the device 102 of FIG. 4A is associated with a user profile, where the user profile is associated with a certain location (such as a home, office, etc.) having certain audio detection devices (for example devices 110*a*, 110*b* and microphone arrays 108*a* and 108*b* of FIG. 1B). In another example, the system may determine a location of device 102 using location components (such as a GPS receiver or the like) and may determine available audio detection devices using the device's location. Other techniques may also be used to determine the audio detection devices available to the system 100.

When listen mode is activated, the user may perform an action to cause the first sound to be made. For example, opening a front door, running a sink, opening a garage, saying certain word(s) etc. When the first sound has completed, the user may select the done button 406. While the listen mode is active (i.e., between when the system detects selection of the listen button 402 and the done button 406), the system 100 may be detecting audio with the available audio detection devices. Using the detected audio (and the corresponding detected audio data), the system may create one or more sound profile(s), model(s), acoustic signature(s) or similar data that correspond to the first sound. For example, an acoustic signature may describe acoustic characteristics (such as frequency and amplitude, etc.) that correspond to the first sound. Alternatively, the system may combine the use of pre-stored audio models with specific user training, where the system starts with a model for a specific sound (e.g., opening a door) and uses the information received during the listen/train mode to alter the pre-stored model or adjust the system's treatment of that model to more specifically recognize the first sound selected by the user. The updated audio information may then be stored in the appropriate sound profile(s). The system may also prompt the user to perform the listen mode for the first sound (as illustrated in FIG. 4A) a plurality of times, so that the system 100 will have several different examples of audio data corresponding to the first sound, thus allowing the system 100 to have more data from which to create more robust model(s) corresponding to the first sound. Thus, for example, if the user is training the system to recognize an opening of a door in a house, the system may prompt the user to open the door repeatedly to improve the training of the system. The system may also prompt the user to repeat the sound under different acoustic conditions (for example, while people are talking, while music is playing in the background, while the TV is on, etc.). One benefit to such training is that noises that appear natively in the specific acoustic environment may be incorporated by the system during the training. Thus, while a door closing may sound differently in different homes, by training on examples of the specific sound itself, the system may more accurately detect when the specific sound is detected. A model, acoustic signature, or other data to be used by the system to detect the first sound as represented in audio data may be stored by the system, for example in a sound profile in storage 282 to be used by the sound recognition module 280 during runtime.

Figure 4B:
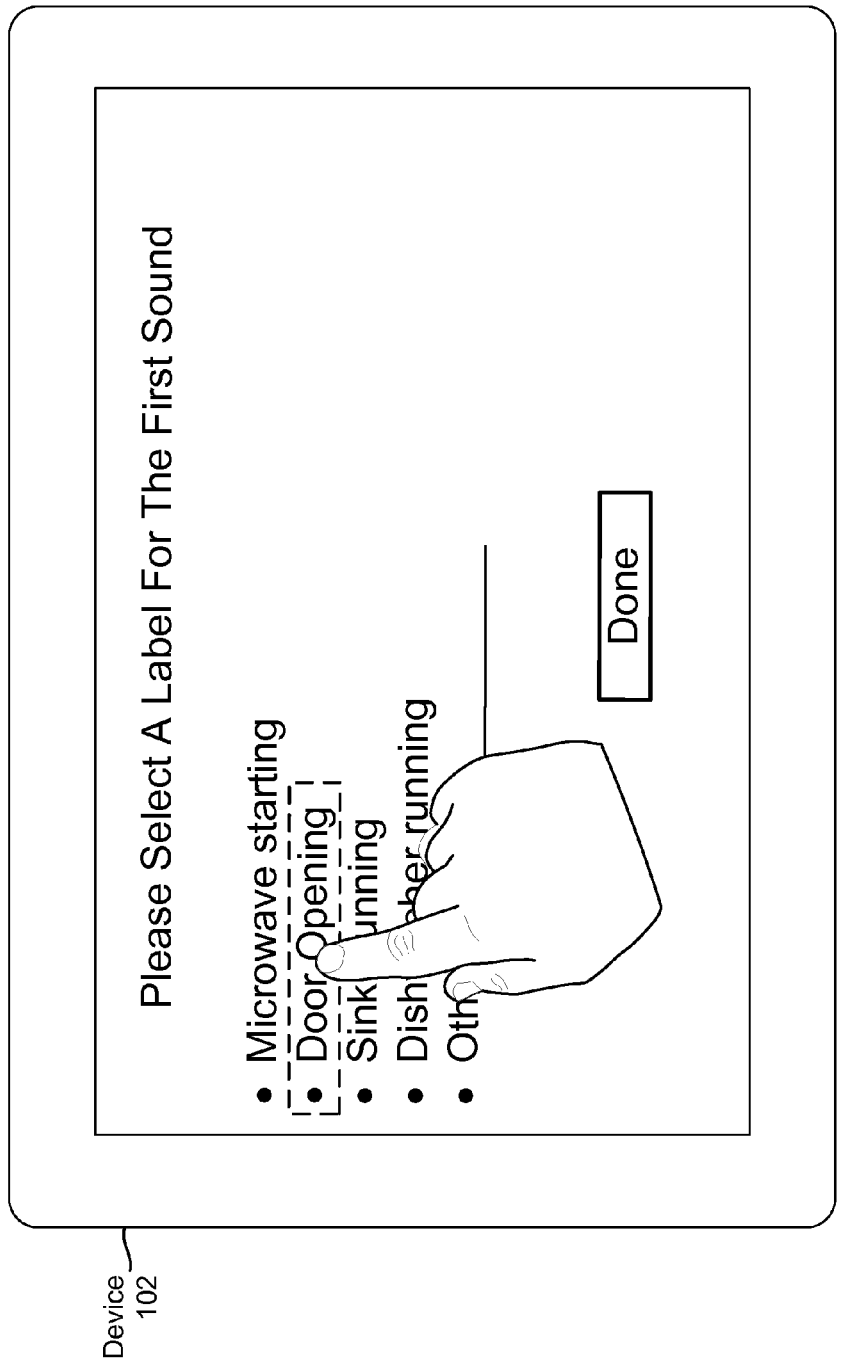

As illustrated in FIG. 4B, the system may also present the user with the opportunity to select a label for the first sound. The label may be selected from a number of options presented to the user or the user may create a custom label. In certain configurations the system may provide the user with options based on a category of the audio command. For example, the system may provide the user with different categories of commands (home, office, external, etc.) and based on the user's selection of a category, different sounds labels may be presented (e.g., the user selects "home" and the system presents the user with selections of noise names associated with a home, such as those illustrated in FIG. 4B). The system may also allow a user to customize a name for the first sound.

Following training for the system to detect and label the first sound, the system may repeat the process for the second sound, as illustrated by FIGS. 4C and 4D. As illustrated in FIG. 4D, however, the system may present the user with different sound label choices based on the sound being the second sound (for example, door closing instead of door opening). This training may occur in a similar manner to training for the system to detect the first sound, as described above. Data corresponding to the first sound/second sound (which may include audio data, model(s), etc.) may be stored with an indication that the data corresponds to the user 10, the user's profile, the home in question, the audio detection devices, etc. so that the system may identify the appropriate environment corresponding to the data and/or sound(s) at run time. In the example of the first sound being a sink being turned on, the second sound may be the sink being turned off.

The system may also configure the threshold time between when the first sound is detected and when the second sound is expected. The threshold time may be received in an indication from a user, for example from a spoken command or a command entered into a companion device 102. For example, as shown in FIG. 4E, an application may prompt a user to select a time threshold. As illustrated in FIG. 4E, the user may select a time (e.g., 30 seconds) and may select "done." The system may then store an indication of the time threshold, which may be associated with the first sound, second sound, user profile and/or other indication of operation. The threshold time/time period between sounds may also be set in a number of other ways besides as a result from an explicit user choice. The time period may be set by a default setting associated with the system and/or an application. The time period may be a default setting associated with a particular first sound and/or second sound, for example a 15 second default time for a door being closed after it is opened. The system may also process and store information about different sounds over some period of use (either for the specific user or for a group of users) so the system may learn (for example using machine learning techniques) the length of time appropriate for the time threshold and may use that learned length of time. Any combination of the above techniques may also be used. For example the display of FIG. 4E may offer a user a default time or learned time, but may allow the user to edit the offered time, etc.

The system may also configure the command to be executed if the second sound is not detected within the time threshold of the first sound. The system may request a command be selected by a user, or a command may be selected by the system, such as in the example of pre-configured first-second sound pairs. The system may present a list of potential commands to a user, or may offer a user the ability to indicate a different command (for example using a spoken selection, search query, etc.). An example of a user interface to select the command is shown in FIG. 4F. As shown in FIG. 4F, a number of potential commands may be output (for example on a display, as part of an audio output, etc.). Sample commands may include sending an email, sending a text message, playing a sound, speaking a message, launching an application on a device, executing an action on another device (e.g., blinking a light), etc. In the example of FIG. 4F, the user selects "Speak Message."

The system may then receive an input (either spoken, through device 102, or otherwise) indicating additional data related to the command. For example, the system may receive a message delivery address, message contents, selection of application to launch, etc. The system may store an indication of the command and other associated information in a manner associated with the first-second sound pair, user or home profile/ID, etc. The command information may be retrieved and acted upon (for example by a command processor 290) upon a second sound not being detected within a time threshold of a first sound. In the example of the command being to speak a message, the user may input the message either through a spoken utterance (during which the system may record the message for later playback as part of command execution) or may perform ASR processing to obtain the text of the command. Alternatively, as illustrated in FIG. 4F, the system may prompt the user for the message to be spoken using device 102. The device 102 may then receive text corresponding to the message. The text may be stored by system 100. The system may then process the text at the appropriate time (for example by TTS module 292) to output a spoken message (which corresponds to the selected command to be executed).

Figure 4H:
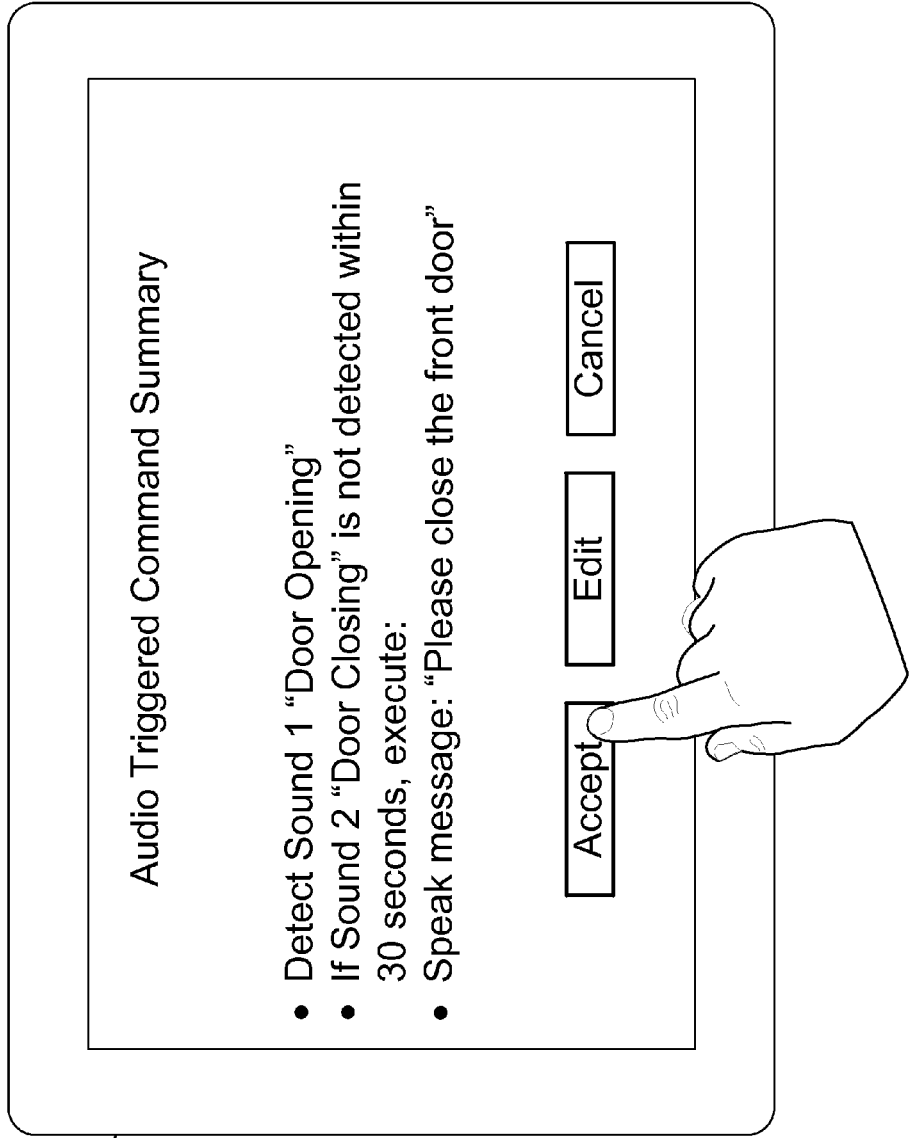
Figure 4I:
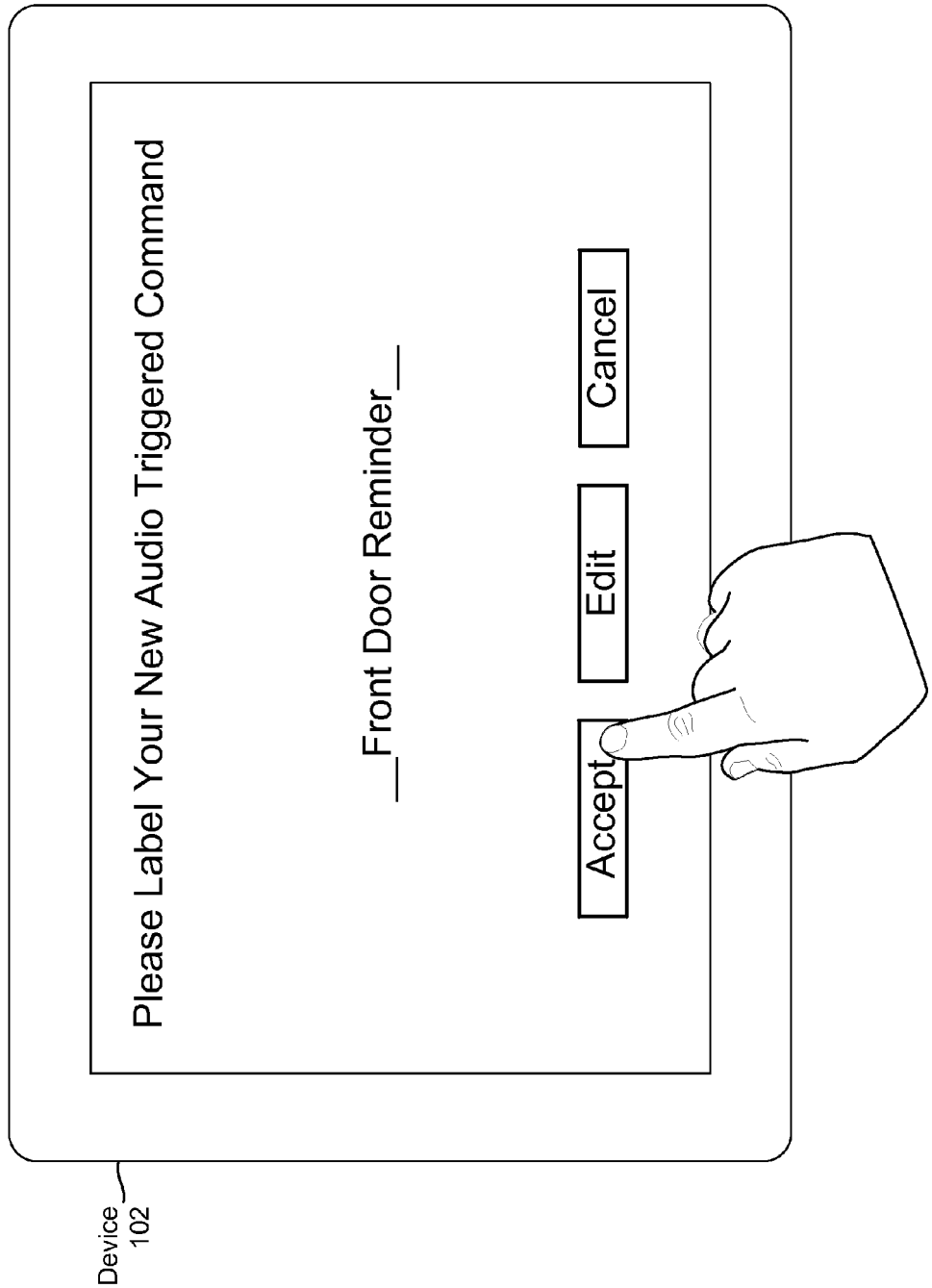

Finally, following configuration of the audio-triggered command configuration, as illustrated in FIG. 4H, the system may list for the user the first-second sound pairing, the time threshold, and the command to be executed. The system may present the user with options to accept, edit, or cancel the command. Upon acceptance, the system may store data linking the first sound, second sound, time threshold, command information and user/home profile/ID, or other information that may be used to initiate the audio triggered command. Following acceptance of the conditions of the audio triggered command, the system may present the user with the option to label the audio triggered command, as illustrated in FIG. 4I. The system may then store the label along with data corresponding to the different sounds, threshold(s), etc. The system may make the command available to the user (for example by linking the command to a user profile), so the user may review/edit/delete programmed commands at a later time.

The above training examples of FIGS. 4A-4I may be performed when initiated by a user, for example when the user wishes to create a new audio-triggered command. In another embodiment, the system may prompt the user to activate certain pre-selected sounds (door opening, car starting, etc.) so that certain system selected (or pre-configured) audio-triggered commands may be configured for the user's specific acoustic environment. Further, while FIGS. 4A-4I illustrate the user interacting with the system using a companion device 102, the user may also train the system using spoken voice commands that are processed using ASR/NLU techniques as described above. For example, the system may use TTS techniques to prompt the user to activate certain sounds for purposes of training the system. Thus, spoken commands may be used to navigate and operate the present system.

Figure 5B:
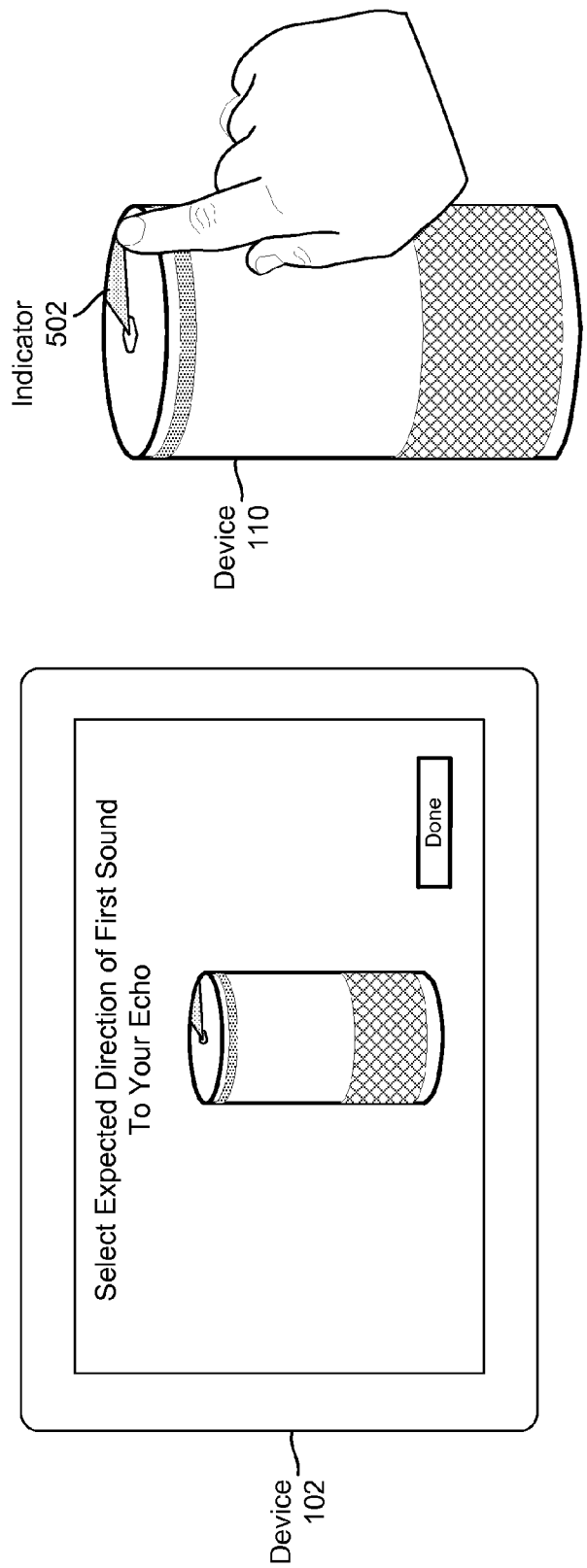

The system 100 may also receive input regarding an expected direction from which the first sound or second sound may be expected. For example, as illustrated in FIG. 5A, the system may present a user with a screen to select a direction, relative to a receiving device, a sound may come from. This expected direction may be input as part of the configuration process discussed above in reference to FIGS. 4A-4I. As illustrated in FIG. 5A, the user may indicate on device 102 an expected direction from which device 110 may expect to detect a sound. Alternatively, as illustrated in FIG. 5B, the user may indicate on device 110, a direction from which the device 110 may expect to detect a sound. To receive the indication, the device 110 may be configured with a touch sensitive top or may be configured with a dial a user may turn to indicate where the sound will come from. The device 110 may also be configured to display an indicator 502 that shows the user the direction the user has indicated. The device 110 may communicate with device 102 such that the device 102 may also display the device 110 and the indicator 502 during the direction selection process. Upon the user selecting the button "Done" the device 110 may turn off the indicator 502.

In another embodiment of the system, the system may include one or more cameras 1312 (illustrated in FIG. 13) such as a home security camera or the like. The camera may provide images to the system that may be used in configuring an expected sound direction. For example, as illustrated in FIG. 6, the system 100 may have an image (such as a floorplan, map, etc.) associated with the user's home, office, or available audio detection devices. The audio command configuration application may offer the user the ability to select a location from which the first sound may be expected using the image. In the example of FIG. 6, the user may select the southeast corner of the "First Floor," corresponding to where the front door is located. The system may store information corresponding to where each of the audio capture devices are located in the floorplan (or otherwise displayed location information.) The system may then use information about the configuration, setup and/or relative location of the audio capture devices to determine how receiving audio from the selected expected source location would be experienced by each respective audio capture device.

Using expected direction information obtained above the system may use beamforming or other audio directional techniques to weight audio received at runtime to more heavily weight audio received from an indicated direction to determine if a specified sound is detected. The direction process may be performed for the first sound and/or the second sound.

Figure 7:
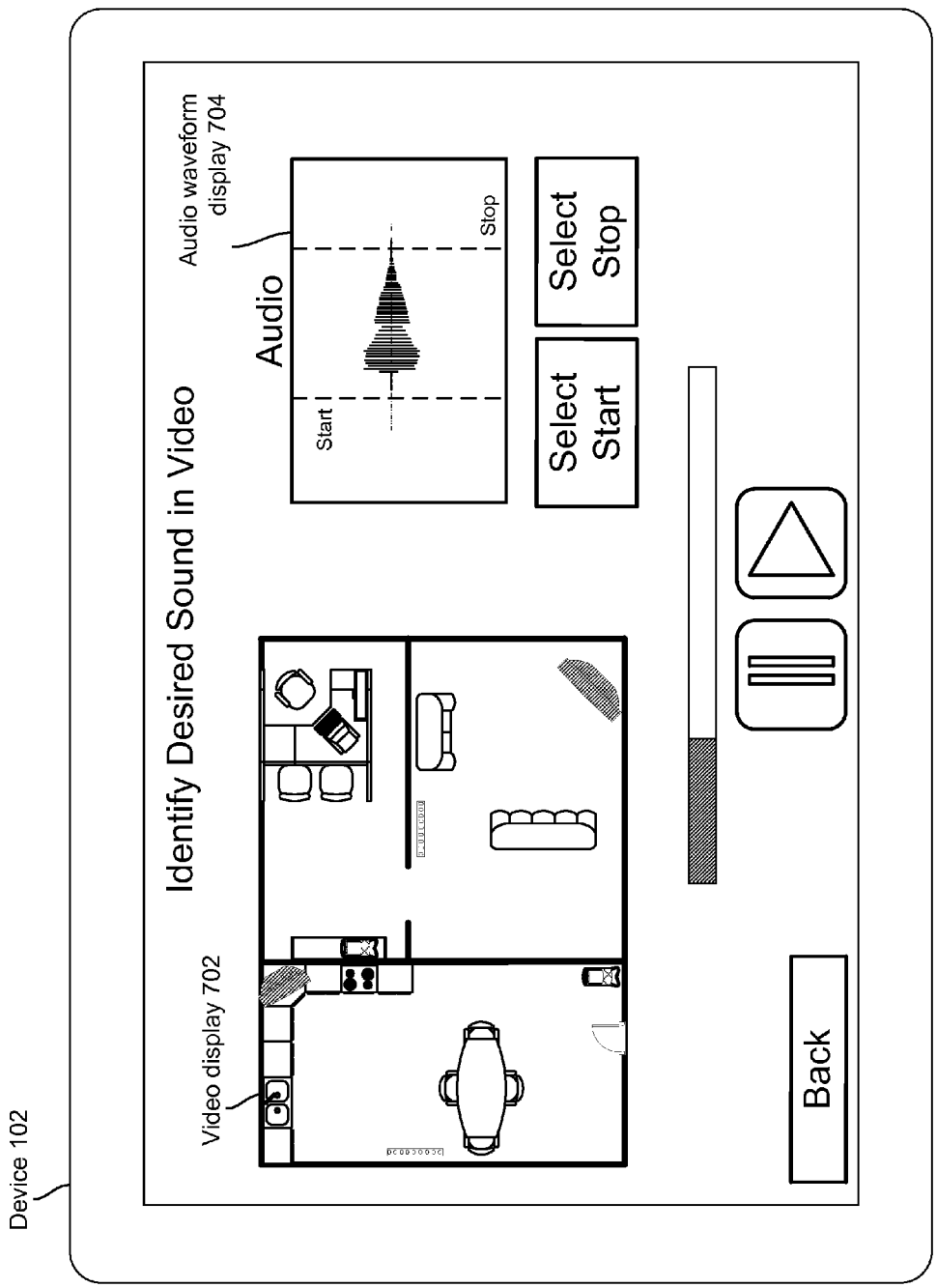
FIG. 7 illustrates configuring a recognized sound according to embodiments of the present disclosure.

In another embodiment the system may allow the user to configure a desired sound using video, such as video captured using camera 1312 along with corresponding audio captured by sound detection devices of the system. For example, as shown in FIG. 7, the audio command configuration application may allow a user to play back a video on the device 102 as shown in video display 702. As the video plays, waveforms corresponding to the audio of the video being played may also be displayed as shown in audio waveform display 704. The user may watch the video and listen the audio of the video to identify the desired sound. When the desired sound is heard, the user may mark the beginning and end of the desired sound using the device 102. The system may then use the audio data corresponding to the selected sound to create/store model(s), acoustic signature(s), or other data to be used by the system to detect the sound at runtime.

Figure 8:
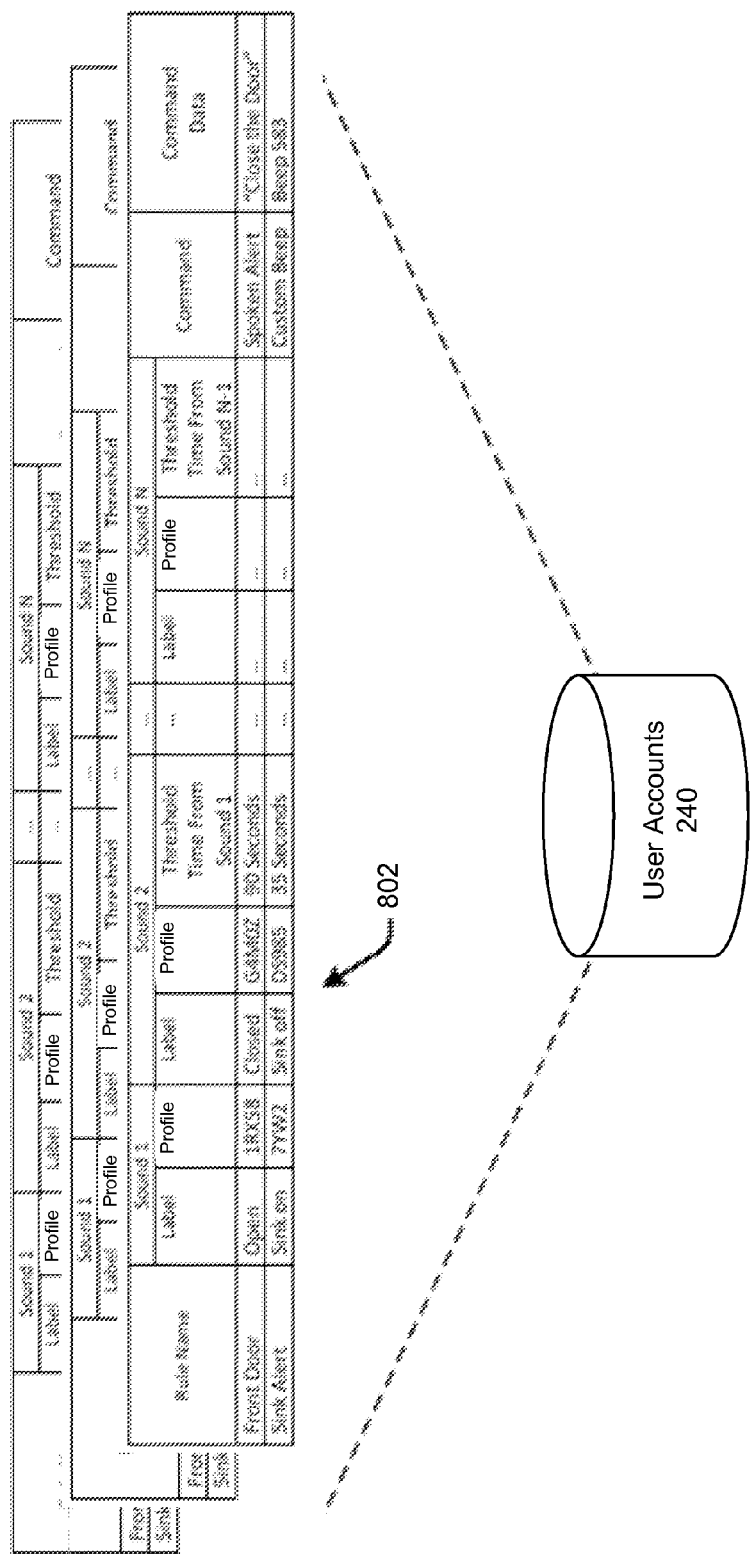
FIG. 8 illustrates data stored and associated with user accounts according to embodiments of the present disclosure.

As shown in FIG. 8, the user account storage 240 may also include rules associated with user accounts. The rules data may include a variety of information including rule name, sound labels, sound profiles, threshold times, commands, command data (used to execute the commands), etc. The rules/sounds may also be associated with particular devices, for example devices linked to the user accounts as illustrated above in FIG. 3.

Figure 9:
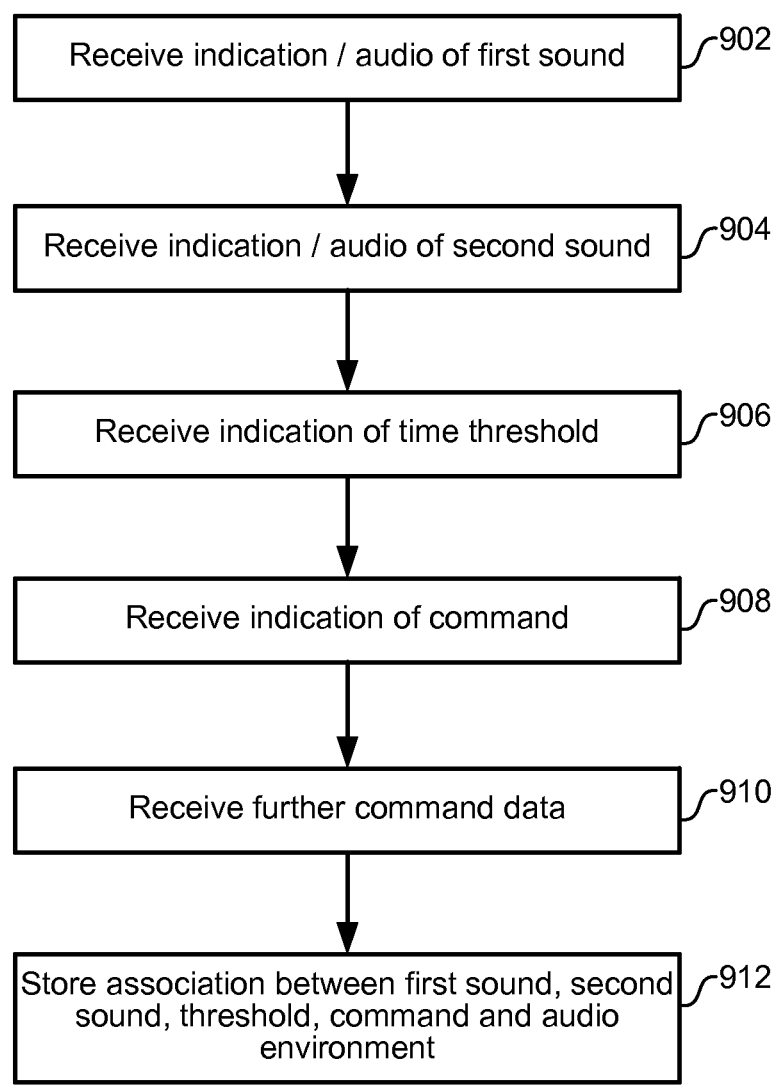
FIG. 9 is a flow diagram illustrating configuring an audio triggered command according to embodiments of the present disclosure.

FIG. 9 is a flow diagram illustrating configuring an audio triggered command according to embodiments of the present disclosure. As shown, the system may receive (902) an indication of, or audio corresponding to, a first sound. The indication may result from a selection of pre-configured sounds. Or the indication may include a first sound profile corresponding to first audio data corresponding to the first sound (for example, as recorded during a listen operation discussed above with regard to FIG. 4A). The indication may also include direction data associated with the first sound (for example, as discussed above with regard to FIG. 4B). The system may also receive (904) an indication of, or audio corresponding to, a second sound. The indication may result from a selection of pre-configured sounds. Or the indication may include a second sound profile corresponding to second audio data corresponding to the second sound (for example, as recorded during a listen operation discussed above with regard to FIG. 4C). The indication may also include direction data associated with the second sound (for example, as discussed above with regard to FIG. 4D).

The system may also receive (906) an indication of a time threshold, for example as discussed above with regard to FIG. 4E. The indication may result from a selection of pre-configured time thresholds or may be a non-pre-configured time threshold indicated in a user input. The system may also receive (908) an indication of a command to execute in response to detecting the first sound, but then not detecting the second sound within the time threshold, for example as discussed above with regard to FIG. 4F. The indication may result from a selection of pre-configured commands from which a user may select, or may be a non-pre-configured command indicated in an open-ended user input. The system may also receive (910) further command data, for example as discussed above with regard to FIG. 4G. The further command data may include data associated with or used to execute the command (message delivery information, message content information, audio output volume, desired synthesized speech voice, executable application information, etc.) The system may then store (912) data associating the first sound, second sound, threshold, command, and/or audio environment/user information. In the example of the running sink, for example, the system may store an association between the first sound profile (of the sink starting), the second sound profile (of the sink stopping), the command (to speak a message), and the audio environment (the first floor of FIG. 1B with devices 110a and 110b and arrays 108a and 108b).

Figure 10:
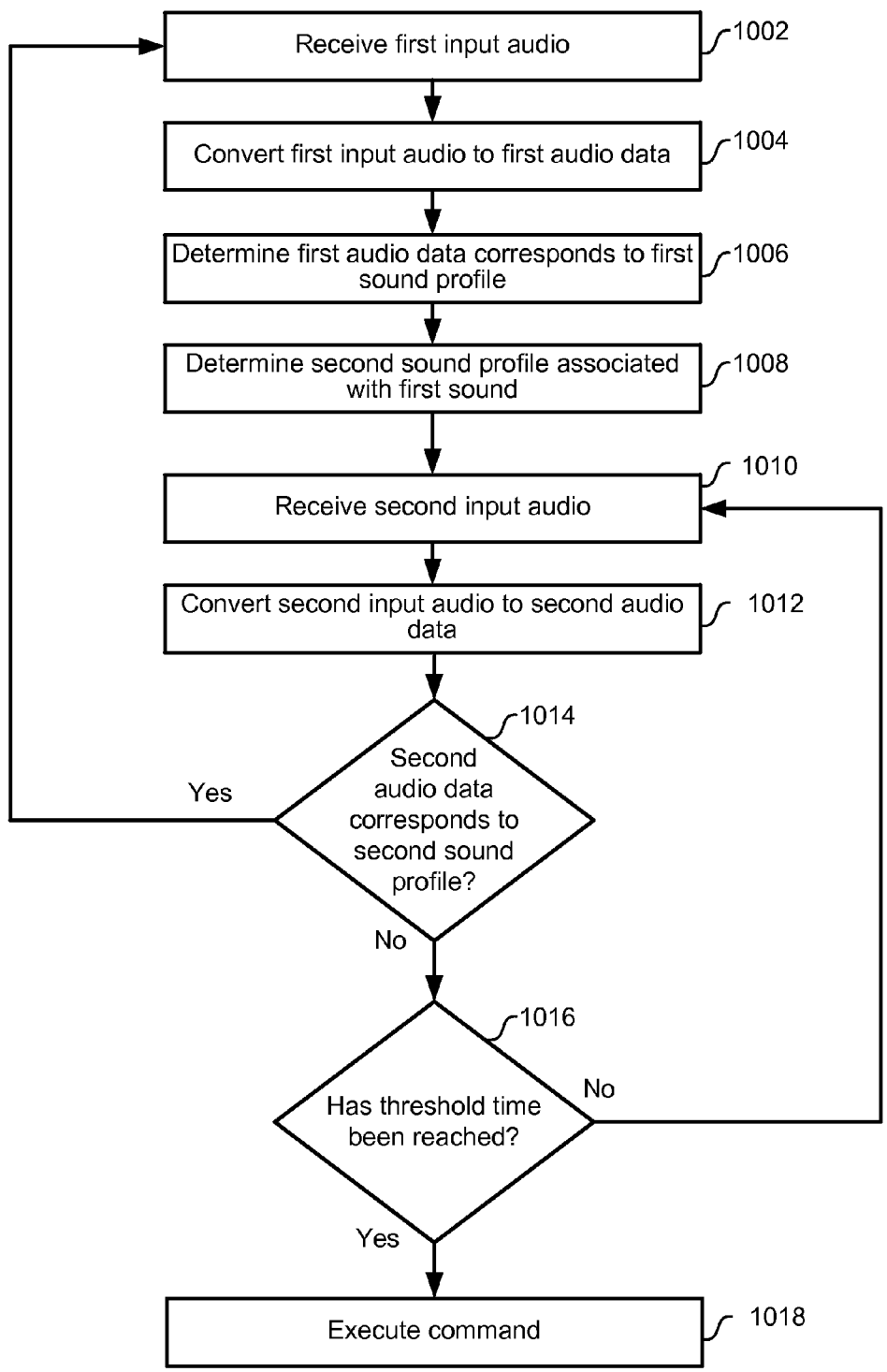
FIG. 10 is a flow diagram illustrating executing an audio triggered command according to embodiments of the present disclosure.

FIG. 10 is a flow diagram illustrating executing an audio triggered command according to embodiments of the present disclosure. The executing may occur after configuring the system to execute an audio triggered command, for example as illustrated above in reference to FIG. 9. As shown in FIG. 10, the system may receive (1002) first input audio. The first input audio may be received by one or more audio capture components/devices of the system. The system may convert (1004) the first input audio to first audio data, for example by an AFE 256 or other component of the system. The system may determine (1006) that the first audio data corresponds to a first sound profile. For example, a sound recognition module 280 may compare the first audio data to data in one or more sound profiles stored in storage 282, where one or more of the profile(s) correspond to the first sound. For example, the sound recognition module 280 may compare the first audio data to one or more model(s), acoustic signature(s) or other data stored in various sound profiles. If the sound recognition module 280 determines that the first audio data corresponds to a particular model(s) (for example, if the first audio data has a sufficiently high correlation with the model(s)) the system may determine that the first audio data corresponds to the first sound profile including the matching model(s). The system may then determine (1008) a second sound profile associated with the first sound. For example, the system may review stored data to identify a stored association between the first sound profile and second sound profile. The system may then identify one or more models associated with the second sound profile.

The system may then receive (1010) second input audio and convert (1012) the second input audio to second audio data, for example by an AFE 256 or other component of the system. The system may then determine (1014) if the second audio data corresponds to data associated with the second sound profile. Determining whether the second audio data corresponds to the second sound profile may be performed in a similar manner to determining whether the first audio data corresponds to the first sound profile. For example, the sound recognition module 280 may compare the second audio data sufficiently matches one or more models corresponding to the second sound profile. In certain system configurations, however, the tasks of detecting the first sound in audio data and determining the second sound in audio data may be divided among components of the system. For example, a first device (such as device 110a) may determine if the first sound is detected. Following detection of the first sound, the appropriate audio capture device(s) may send the second audio data to a server(s) 120 for further processing such that a sound recognition component 280 located on the server(s) 120 may determine (1014) if the second audio data corresponds to the second sound profile. Dividing processing in this manner may reduce the burden on local devices (such as device 110a) for performing recognition of the second sound. It may also allow the system to dedicate more computing resources to recognition of the second sound as server(s) 120 may typically be configured with greater resources than device 110.

If the second audio data does correspond to the second sound profile, meaning the second sound was heard within the time threshold, (1014: Yes), then the system may cancel a potential audio triggered command and may resume audio detection for the first sound. For example, if the first sound is a door opening and the second sound is a door closing, when the system detects the door closing within the threshold of the door opening, no command need be executed. If the second audio data does not correspond to the second sound profile (1014: No), the system may check (1016) if the time threshold has been reached. Although illustrated as happening after checking the second audio, determination of reaching of the time threshold may occur at a different location in the process illustrated in FIG. 10. Indeed, unless explicitly stated otherwise, the order of the described functions and operations described herein is meant to be illustrative rather than obligatory. If the time threshold has not been reached (1016: No), the system may continue receiving (1010) and processing second audio. If the time threshold has been reached (1016: Yes), the system may execute (1018) the command associated with the particular first sound-second sound-threshold grouping.

In making the determination whether audio data matches a sound profile (such as whether the first audio data corresponds to the first sound profile (1006) or whether the second audio data corresponds to the second sound profile (1014)), the system may compare the audio data to a stored model, acoustic signature, etc. of the sound to obtain a confidence score that the audio data matches a stored model of the sound profile. The confidence score may be compared to a confidence threshold, and if the score exceeds the threshold, the system may determine that the audio data represents the desired sound. The confidence threshold may be dynamic and may be adjusted based on certain circumstances. For example, if the audio data corresponds to an expected direction of a sound, then a confidence threshold at a first value may be used, whereas if the audio data corresponds to a different direction than an expected direction, a confidence threshold of a second value higher than the first value may be used. In other words, if audio is coming from an unexpected direction, the system may need to be extra confident that the audio data matches before determining that the sound was detected. Further, the confidence threshold may be altered based on how much time has elapsed since the first sound was detected. For example, as the time elapsed approaches the threshold time, the confidence threshold used to match second audio data to a stored model corresponding to a second sound may be lowered, as the system is expecting the second sound closer to the threshold time. Other adjusting of the confidence threshold may also be used.

Executing the command may include identifying, in storage, the command associated with the first sound, second sound, and/or threshold. The command may be passed to an appropriate command processor 290 for execution. The command may include a command to output synthesized speech, in which case an indication may be sent to the TTS module 292 including the text to synthesize, information about the desired speech qualities of the ultimate speech (e.g. voice, tone, pace, etc.) along with potentially other information such as destination location, etc. The output of the TTS module 292 may be sent to the appropriate device for output (for example device 110a) along with potentially other information (volume, output direction information, etc.) so that the appropriate device may output audio corresponding to the speech. The device that outputs the speech may be the same device or a different device that detected the input audio 11.

Although the above discusses detecting a first sound (relevant to a pairing of the first sound to the second sound), the system may analyze audio for multiple sounds substantially in parallel, thus allowing the system to attempt detection of multiple first sound-second sound pairs (front door closing/opening, sink turning on/off) substantially in parallel.

As may be appreciated, the same first sound-second sound pair may have different thresholds-functions associated with it, such that the system may perform different functions when a second sound has not been detected at different times since the first sound was detected. For example, in the door open (first sound)-door closed (second sound) example, at a threshold of 60 seconds, a command may be to speak a message associated with the text "please close the front door" whereas at a threshold of 3 minutes, a command may be to speak a message (at a higher volume) with the text "the front door is still open," and still further at a threshold of 5 minutes, a command may be to send a text message to a user with the text "the home front door has been ajar for 5 minutes." Many variations are possible.

Further, while the above may describe examples of sound pairs, other sound groupings, such as three or more sounds may also be possible. For example, a three-sound group may involve a first sound, a second sound and a third sound as well as a first threshold between the first sound and the second sound, a second threshold between the second sound and the third sound, and even potentially a third threshold between the first sound and the third sound. If certain sounds are not detected within the prescribed thresholds, certain commands may be executed in the manner described herein. Thus, the system may be operable to execute commands based on sound-threshold groups that include more than two sounds and one time threshold.

The system may be used to assist with a variety of parenting tasks, for example reminding young children to wash their hands after using the bathroom (e.g., the first sound is a toilet flushing, the second sound is a bathroom sink running, and the command is a spoken message to wash hands). As described above, the system may also be used to remind children to turn off a sink (e.g., the first sound is a sink being turned on, the second sound is a sink being turned off, and the command is a spoken message to turn off a sink). The system may also remind a person to close a door (e.g., the first sound is a door being opened, the second sound is a door being closed, and the command is a spoken message to close the door). The above system may also be particularly useful for users with hearing impairments as the command to be executed may be to flash a visual indicator (such as an LED, lamp, etc.), send a message describing the situation, etc.

The above system may also be configured to engage in other activities, such as games, using the audio initiated commands. For example, a parent may program the system to detect certain sounds in a certain order (a child jumping, followed by a door opening and closing twice, or the like). The parent may then activate the program (or game) to entertain a child.

Figure 11:
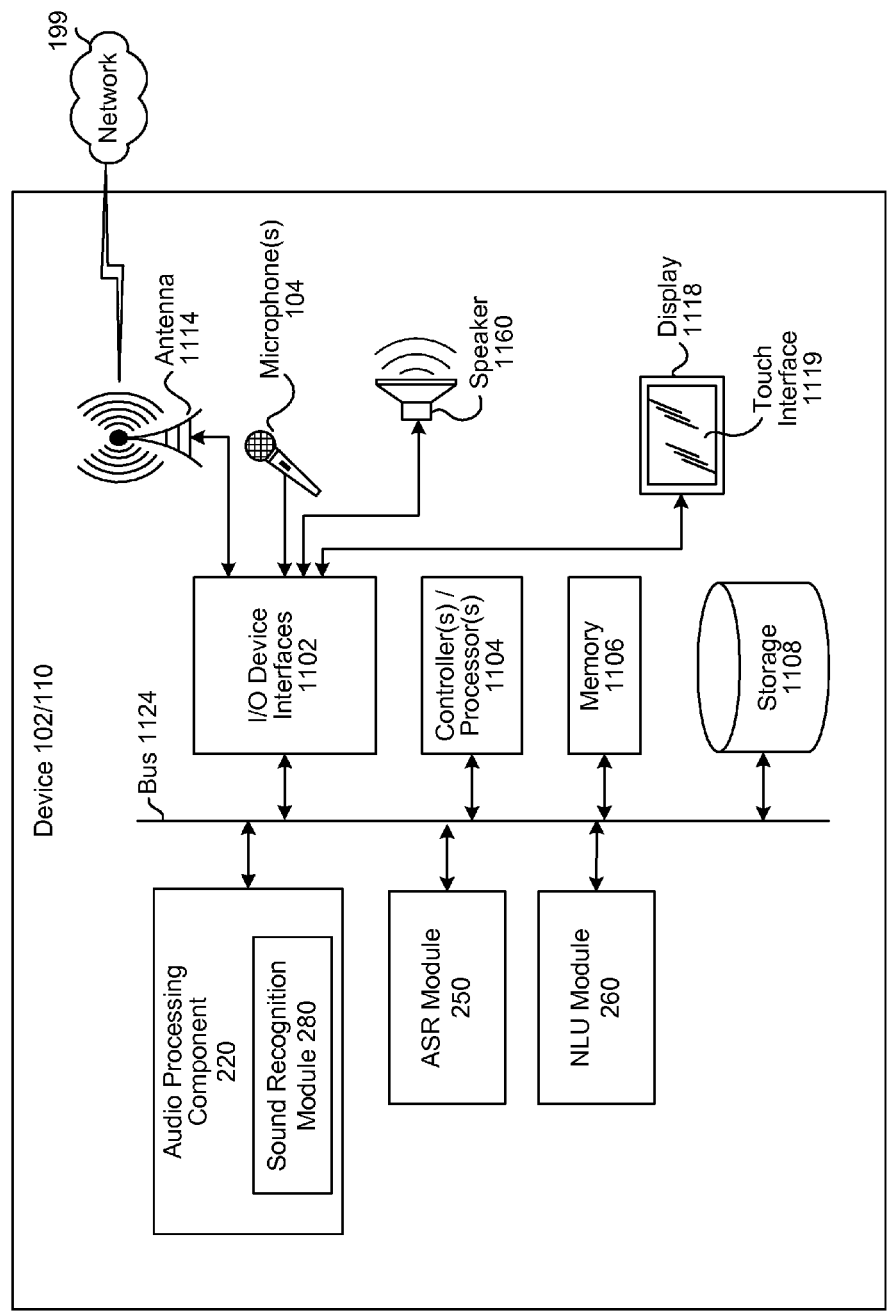
FIG. 11 is a block diagram conceptually illustrating example components of a device according to embodiments of the present disclosure.
Figure 12:
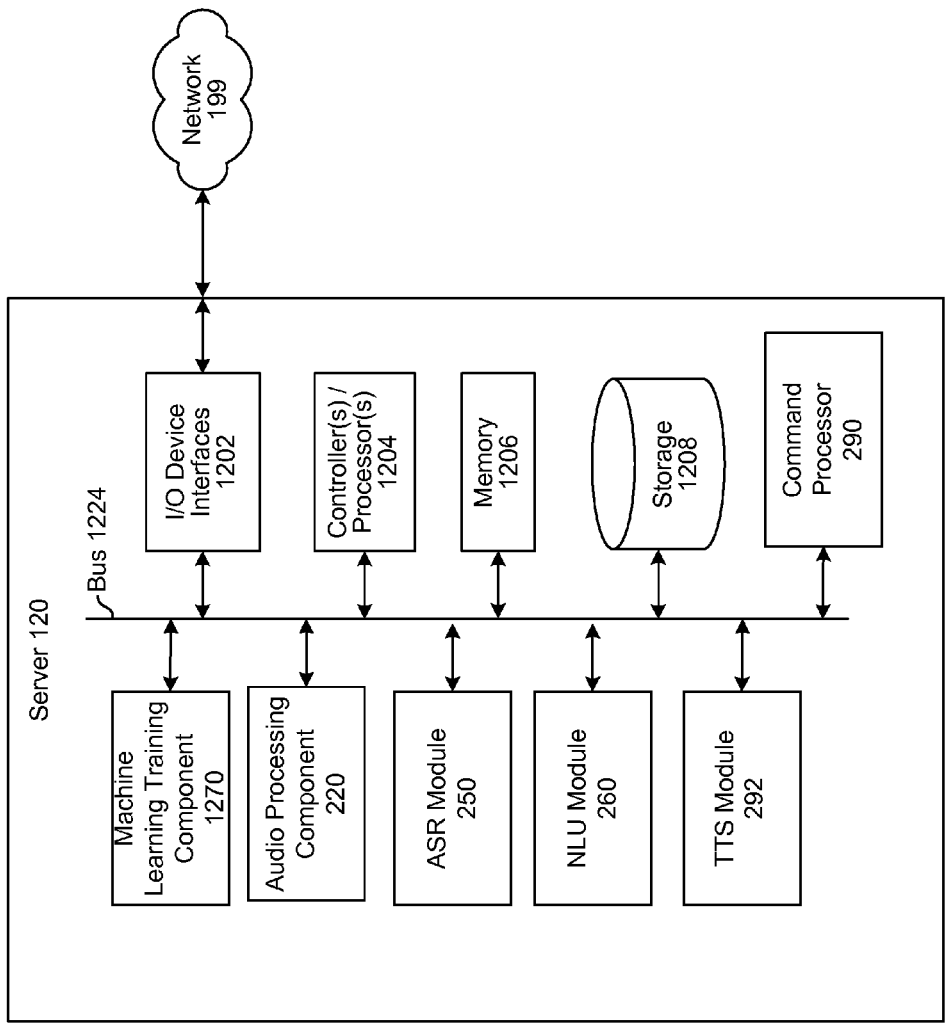
FIG. 12 is a block diagram conceptually illustrating example components of a server according to embodiments of the present disclosure.

FIG. 11 is a block diagram conceptually illustrating a local device 110 or companion device 102 that may be used with the described system and may incorporate certain speech receiving/sound detecting capabilities. FIG. 12 is a block diagram conceptually illustrating example components of a remote device, such as a remote server 120 that may assist with ASR, NLU processing, or command processing. Server 120 may also assist in detecting sounds represented in audio data as described above. Multiple such servers 120 may be included in the system, such as one server 120 for ASR, one server 120 for NLU, etc. In operation, each of these devices may include computer-readable and computer-executable instructions that reside on the respective device (102/110/120), as will be discussed further below.

Each of these devices (102/110/120) may include one or more controllers/processors (1104/1204), that may each include a central processing unit (CPU) for processing data and computer-readable instructions, and a memory (1106/

1206) for storing data and instructions of the respective device. The memories (1106/1206) may individually include volatile random access memory (RAM), non-volatile read only memory (ROM), non-volatile magnetoresistive (MRAM) and/or other types of memory. Each device may also include a data storage component (1108/1208), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1102/1202). The storage component 1108/1208 may include storage for various data including ASR models, NLU knowledge base, entity library, speech quality models, TTS voice unit storage, sound model storage 282, or other storage used to operate the system.

Computer instructions for operating each device (102/110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (102/110/120) includes input/output device interfaces (1102/1202). A variety of components may be connected through the input/output device interfaces, as will be discussed further below. Additionally, each device (102/110/120) may include an address/data bus (1124/1224) for conveying data among components of the respective device. Each component within a device (102/110/120) may also be directly connected to other components in addition to (or instead of) being connected to other components across the bus (1124/1224).

Referring to the device 110 of FIG. 11, the input/output device interfaces 1102 connect to a variety of components such as an audio output component such as a speaker 1160, a wired headset or a wireless headset (not illustrated) or an audio capture component. The audio capture component may be, for example, a microphone 104 or array of microphones 108, a wired headset or a wireless headset (not illustrated), etc. If an array of microphones 108 is included, approximate distance to a sound's point of origin may be performed acoustic localization based on time and amplitude differences between sounds captured by different microphones of the array. The microphone 104 may be configured to capture audio, including speech including an utterance. The device 110 (using microphone 104, audio processing component 220, etc.) may be configured to determine audio data corresponding to the captured audio. The device 110 (using input/output device interfaces 1102, antenna 1114, etc.) may also be configured to transmit the audio data to server 120 for further processing.

For example, via the antenna(s), the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

Each device (102/110/120) may include an ASR module 250. The ASR module in device 102/110 may be of limited or extended capabilities. If limited speech recognition is included, the ASR module 250 may be configured to identify a limited number of words, such as wakewords detected by the device, whereas extended speech recognition (such as on a server 120) may be configured to recognize a much larger range of words.

Each device (102/110/120) may include a limited or extended NLU module 260. The NLU module in device 102/110 may be of limited or extended capabilities. The NLU module 260 may comprising the name entity recognition module 262, the intent classification module 264 and/or other components.

One or more servers 120 may also include a command processor 290 that is configured to execute commands associated with a second sound not being detected within a time threshold of first sound, as described above. One or more servers 120 may also include a machine learning training component 1270 that is configured to determine one or more models used by, for example, a sound recognition module 280 as part of an audio processing component 220.

The device 102/110 may include an audio processing component 220 which processes audio detected by the device 102/110. The audio processing component 220 may include an AFE 256, which creates certain kinds of audio data as described above. The audio processing component 220 may also include a sound recognition module 280 (and associated storage 282), which may be a separate component or may be included in an ASR module 250. The sound recognition module 280 receives audio signals and detects occurrences of certain sounds (such as a configured first sound or second sound) in the audio. This may include detecting a change in frequencies over a specific period of time where the change in frequencies results in a specific acoustic signature that the system recognizes as corresponding to a specific sound. Sound recognition (also known as acoustic event detection) may include analyzing individual directional audio signals, such as those processed post-beamforming if applicable. Other techniques known in the art of acoustic event detection (or keyword detection/spotting) may also be used. In some embodiments, the device 102/110 may be configured collectively to identify a set of the directional audio signals in which the sound is detected or in which the sound is likely to have occurred.

The sound recognition module 280 receives captured audio and processes the audio (for example, using model(s) in storage 282) to determine whether the audio corresponds to a particular sound recognizable by the device 110 and/or system 100. The storage 1108 may store data (for example, storage 282 and/or other data) relating to sounds to enable the sound recognition module 280 to perform the algorithms and methods described above. The locally stored sound models may be pre-configured based on known information, prior to the device 110 being configured to detect specific sounds by the user. For example, the models may be preconfigured for certain common sounds, the models may based on a user profile, etc. In an aspect, the models may be pre-trained using speech or audio data of the user from another device. For example, the user may own another user device that the user operates, and this data may be associated with a user profile. The data from the other user device may then be leveraged and used to train the locally stored sound models of the device 110 prior to the user device 110 being delivered to the user or configured to access the network by the user. The sound recognition module 280 may access the storage 1108 and compare the captured audio to the stored models and audio sequences using audio comparison, pattern recognition, keyword spotting, acoustic signature, acoustic event recognition and/or other audio processing techniques.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 11 and 12, are exemplary, and may be located a stand-alone device or may be included, in whole or in part, as a component of a larger device or system.

Figure 13:
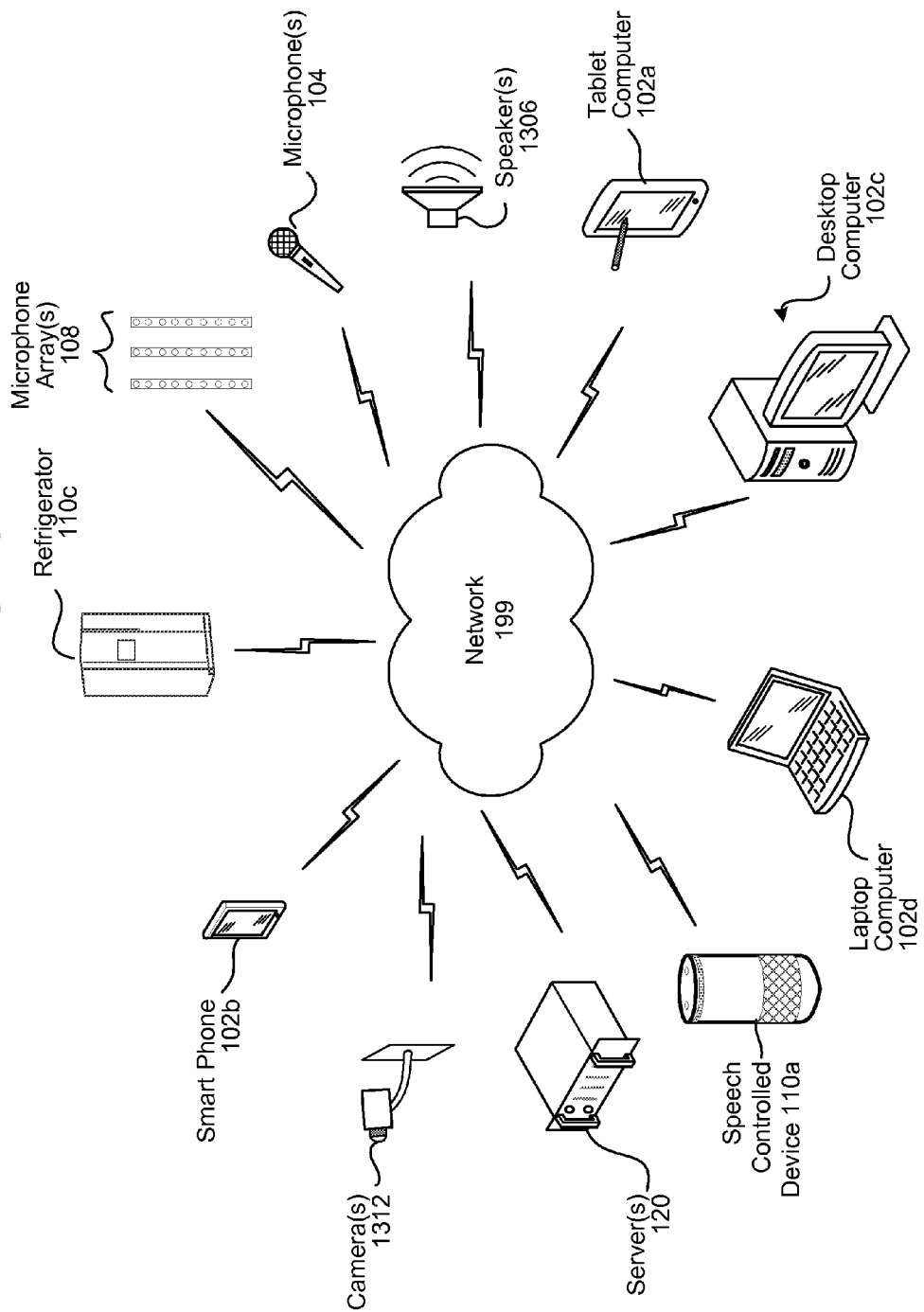
FIG. 13 illustrates an example of a computer network for use with the system.

As illustrated in FIG. 13, multiple devices may contain components of the system 100 and the devices may be connected over a network 199. The network 199 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 199 through either wired or wireless connections. Network 199 may include a local or private network or may include a wide network such as the internet. For example, devices 110, networked microphone array(s) 108, networked single microphone(s) 104, networked audio output speaker(s) 1306, etc. may be connected to the network 199 through a wireless service provider, over a WiFi or cellular network connection or the like. Other devices, such as server(s) 120, may connect to the network 199 through a wired connection or wireless connection. Networked devices 110 may capture audio using one-or-more built-in or connected microphones 104 or audio capture devices, with processing performed by an audio processing component 220, ASR, NLU, or other components of the same device or another device connected via network 199, such as sound recognition module 280, ASR 250, NLU 260, etc. of one or more servers 120.

A device 110, may be associated with a user profile. For example, a device may be associated with a user identification (ID) number or other profile information linking the device to a user account. The user account/ID/profile may be used by the system to perform speech controlled commands (for example commands discussed above in reference to FIG. 2). The user account/ID/profile may be associated with particular model(s) or other information used to identify received audio, classify received audio (for example as a specific sound described above), time thresholds used to determine if a detected sound is within a certain time of another detected sound, or other information used to initiate audio triggered commands of the system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, at a first time, first audio data;
   comparing the first audio data to a first acoustic signature, the first acoustic signature describing first acoustic characteristics corresponding to a first sound, the first acoustic characteristics comprising at least first frequency levels and first volume levels during a first expected duration of the first sound;
   determining, using the first acoustic signature, that the first audio data corresponds to the first sound;
   determining a second sound associated with the first sound;
   determining a time period since the first time during which a second sound is expected;
   receiving, at a second time, second audio data;
   comparing the second audio data to a second acoustic signature, the second acoustic signature describing second acoustic characteristics corresponding to the second sound, the second acoustic characteristics comprising at least first frequency levels and first volume levels during a second expected duration of the second sound;
   determining that the time period since the first time has elapsed, during which the second acoustic signature has not matched the second audio data; and
   executing a command in response to determining that the time period has elapsed.

2. The computer-implemented method of claim 1, further comprising:
   receiving, from a user device, text data from a user input;
   receiving, from the user device, an indication that the text data is associated with a user profile;
   storing an association between the user profile, the text data, the first sound, the second sound, and the time period; and
   determining that the first audio data is associated with the user profile, wherein executing the command comprises:
   performing text-to-speech processing to synthesize speech using the text; and
   outputting the synthesized speech.

3. The computer-implemented method of claim 1, further comprising:
  receiving the first audio data using a microphone array;
  performing beamforming on the first audio data; and
  determining that the first audio data corresponds to a first direction, wherein the first acoustic signature is associated with the first direction and the second acoustic is associated with the first direction.

4. The computer-implemented method of claim 3, further comprising:
  receiving an input from a user device associated with a user profile, wherein the input comprises:
    audio corresponding to the first sound,
    audio corresponding to the second sound,
    an indication of the time period,
    the text, and
    the first direction.
  storing the audio corresponding to the first sound, the audio corresponding to the second sound, the indication, the text and the first direction; and
  associating the user profile with the first sound, the audio corresponding to the second sound, the indication, the text and the first direction.

5. A computer-implemented method comprising:
  receiving first audio data at a first detection time;
  determining that the first audio data corresponds to a first sound profile;
  determining a second sound profile associated with the first sound;
  determining a period of time after the first detection time has lapsed without detecting second audio data corresponding to the second sound profile; and
  executing a command based at least in part on determining that the period of time lapsed without detecting the second audio data.

6. The computer-implemented method of claim 5, wherein determining that the first audio data corresponds to the first sound profile comprises:
  analyzing the first audio data using a stored model corresponding to the first sound profile; and
  determining that the first audio data corresponds to the stored model.

7. The computer-implemented method of claim 6, further comprising:
  receiving the first audio data using a microphone array;
  performing beamforming on the first audio data; and
  determining that the first audio data corresponds to a first direction.

8. The computer-implemented method of claim 7, further comprising determining a period of time after the first detection time has lapsed without detecting the second audio data from a second direction.

9. The computer-implemented method of claim 8, wherein the first direction is substantially the same as the second direction.

10. The computer-implemented method of claim 5, further comprising identifying an output corresponding to at least one of the first sound profile or the second sound profile, wherein executing the command comprises performing text-to-speech processing to generate speech corresponding to the output.

11. The computer-implemented method of claim 5, further comprising receiving an input from a user device, wherein the input indicates at least one of:
  a selection of a first sound corresponding to the first sound profile;
  a selection of a second sound corresponding to the second sound profile;
  the period of time;
  the command; and
  a direction associated with at least one of the first sound profile or the second sound profile.

12. The computer-implemented method of claim 5, wherein executing the command comprises sending a message to a mobile device.

13. A computing system comprising:
  at least one processor;
  a memory including instructions operable to be executed by the at least one processor to cause the system to perform a set of actions comprising:
    receiving first audio data at a first detection time;
    determining that the first audio data corresponds to a first sound profile;
    determining a second sound profile associated with the first sound;
    determining a period of time after the first detection time has lapsed without detecting second audio data corresponding to the second sound profile; and
    executing a command based at least in part on determining that the period of time lapsed without detecting the second audio data.

14. The computing system of claim 13, wherein determining that the first audio data corresponds to the first sound profile comprises:
  analyzing the first audio data using a stored model corresponding to the first sound profile; and
  determining that the first audio data corresponds to the stored model.

15. The computing system of claim 14, wherein the set of actions further comprises:
  receiving the first audio data using a microphone array;
  performing beamforming on the first audio data; and
  determining that the first audio data corresponds to a first direction, wherein the stored model is associated with the first direction.

16. The computing system of claim 15, wherein the set of actions further comprises determining a period of time after the first detection time has lapsed without detecting the second audio data from a second direction.

17. The computing system of claim 16, wherein the first direction is substantially the same as the second direction.

18. The computing system of claim 13, wherein the set of actions further comprises identifying an output corresponding to at least one of the first sound profile or the second sound profile, wherein executing the command comprises performing text-to-speech processing to generate speech corresponding to the output.

19. The computing system of claim 13, wherein the set of actions further comprises receiving an input from a user device, wherein the input indicates at least one of:
  a selection of a first sound corresponding to the first sound profile;
  a selection of a second sound corresponding to the second sound profile;
  the period of time;
  the command; and
  a direction associated with at least one of the first sound profile or the second sound profile.

20. The computing system of claim 13, wherein executing the command comprises sending a message to a mobile device.

\* \* \* \* \*